United States Patent
Erden et al.

(10) Patent No.: US 7,286,313 B2
(45) Date of Patent: Oct. 23, 2007

(54) CORRECTING RADIAL INCOHERENCE IN SERVO TRACK SENSING

(75) Inventors: Mehmet Fatih Erden, Pittsburgh, PA (US); Erozan Mehmet Kurtas, Pittsburgh, PA (US)

(73) Assignee: Seagate Technology, LLC, Scotts Valley, CA (US)

( * ) Notice: Subject to any disclaimer, the term of this patent is extended or adjusted under 35 U.S.C. 154(b) by 356 days.

(21) Appl. No.: 11/012,813

(22) Filed: Dec. 15, 2004

(65) Prior Publication Data

US 2005/0264922 A1  Dec. 1, 2005

Related U.S. Application Data

(60) Provisional application No. 60/574,540, filed on May 26, 2004.

(51) Int. Cl.
*G11B 5/09* (2006.01)
(52) U.S. Cl. .............................. 360/46; 360/39; 360/51
(58) Field of Classification Search .................. None
See application file for complete search history.

(56) References Cited

U.S. PATENT DOCUMENTS

| | | | |
|---|---|---|---|
| 5,726,818 A * | 3/1998 | Reed et al. ............... 360/51 |
| 6,243,224 B1 | 6/2001 | Sacks et al. ............. 360/77.08 |
| 6,345,076 B1 | 2/2002 | Petersen et al. ............ 375/341 |
| 6,373,906 B1 * | 4/2002 | Cideciyan et al. .......... 375/341 |
| 6,426,845 B1 | 7/2002 | Sacks et al. ............. 360/77.08 |
| 6,738,205 B1 | 5/2004 | Moran et al. ................ 360/17 |
| 2002/0150179 A1 | 10/2002 | Leis et al. .................. 375/340 |
| 2003/0095350 A1 | 5/2003 | Annampedu et al. ......... 360/39 |
| 2003/0099052 A1 | 5/2003 | Annampedu et al. ......... 360/39 |
| 2003/0197971 A1 | 10/2003 | Lyle et al. ............... 360/78.04 |
| 2004/0196584 A1 | 10/2004 | Wilson ........................ 360/67 |

OTHER PUBLICATIONS

"Digital Communications" by Proakis, 3rd Edition, 1995, p. 249-253.*

* cited by examiner

*Primary Examiner*—Andrea Wellington
*Assistant Examiner*—Varsha A. Kapadia
(74) *Attorney, Agent, or Firm*—Westman, Champlin & Kelly, P.A.

(57) ABSTRACT

A servo track sensing system receives equalized servo data from a servo demodulator and corrects for radial incoherence in the servo data. The system has a radial incoherence estimator that receives the equalized servo data and provides a radial incoherence estimate. A sequence detector receives the equalized servo data and the radial incoherence estimate, and provides a sequence detector output. A correlator receives the sequence detector output and provides correlator output data. The correlator output data has a reduced level of errors due to radial incoherence.

20 Claims, 23 Drawing Sheets

| Interpolation at | Tap # 1 | Tap # 2 | Tap # 3 | Tap # 4 |
|---|---|---|---|---|
| T/8 | -1/16 | 2/16 | 15/16 | -1/16 |
| 2T/8 | -2/16 | 5/16 | 13/16 | -2/16 |
| 3T/8 | -2/16 | 7/16 | 11/16 | -2/16 |
| 4T/8 | -2/16 | 9/16 | 9/16 | -2/16 |
| 5T/8 | -2/16 | 11/16 | 7/16 | -2/16 |
| 6T/8 | -2/16 | 13/16 | 5/16 | -2/16 |
| 7T/8 | -1/16 | 15/16 | 2/16 | -1/16 |

Equalizer Response for FIG. 6

Equalizer = [-0.05 -0.05 1 -0.05 0.05]

Equalizer Response for FIG. 8

Equalizer = [0.20 -0.44 1 -0.44 -0.20]

CORRECTING RADIAL INCOHERENCE IN SERVO TRACK SENSING

CROSS-REFERENCE TO RELATED APPLICATION

This application claims the benefit of U.S. Provisional Application 60/574,540 filed on May 26, 2004 for inventors Mehmet Fatih Erden and Erozan Mehmet Kurtas, and entitled "Performance in presence of radial incoherence."

FIELD OF THE INVENTION

The present invention relates generally to data storage devices, and more particularly but not by limitation to circuitry and methods to deal with radial incoherence induced by rapid head movement across data tracks.

BACKGROUND OF THE INVENTION

During seek operations, embedded servo information is read from tracks as the read/write head rapidly transverses a number of the tracks. The head movement causes a timing offset between radially adjacent servo tracks called "radial incoherence." Radial incoherence results in phase shift that can be as high as, for example, one clock period after 50 clock periods. Errors in reading the embedded servo information can occur due to increasing phase difference between servo data being read and a demodulator clock as shown in FIG. 5. Known algorithms for dealing with radial incoherence have suboptimal performance in systems with noise, non-linearity and distortion. An algorithm is needed to provide an improved combination of signal to noise ratio and detection probability.

Embodiments of the present invention provide solutions to these and other problems, and offer other advantages over the prior art.

SUMMARY OF THE INVENTION

Disclosed is a servo track sensing system. The servo track sensing system receives equalized servo data from a servo demodulator and corrects for radial incoherence in the servo data.

The servo track sensing system comprises a radial incoherence estimator. The radial incoherence estimator receives the equalized servo data, and provides a radial incoherence estimate.

The servo track sensing system also comprises a sequence detector. The sequence detector receives the equalized servo data and the radial incoherence estimate. The sequence detector provides a sequence detector output.

The servo track sensing system also comprises a correlator. The correlator receives the sequence detector output and provides a correlator output. The correlator has a reduced level of errors due to radial incoherence. The correlator output correlates P sequential samples with a known sequence, where P is preferably P=4.

In a preferred embodiment, the servo track sensing system includes an FIR filter that receives unequalized servo data and provides the equalized servo data. The FIR filter includes an equalizer that equalizes over a single clock cycle.

In another preferred embodiment, the unequalized servo data comprises position error signals and the sequence detector comprises a Viterbi sequence detector and interpolation filters.

Other features and benefits that characterize embodiments of the present invention will be apparent upon reading the following detailed description and review of the associated drawings.

DETAILED DESCRIPTION OF ILLUSTRATIVE EMBODIMENTS

Figure 1A:
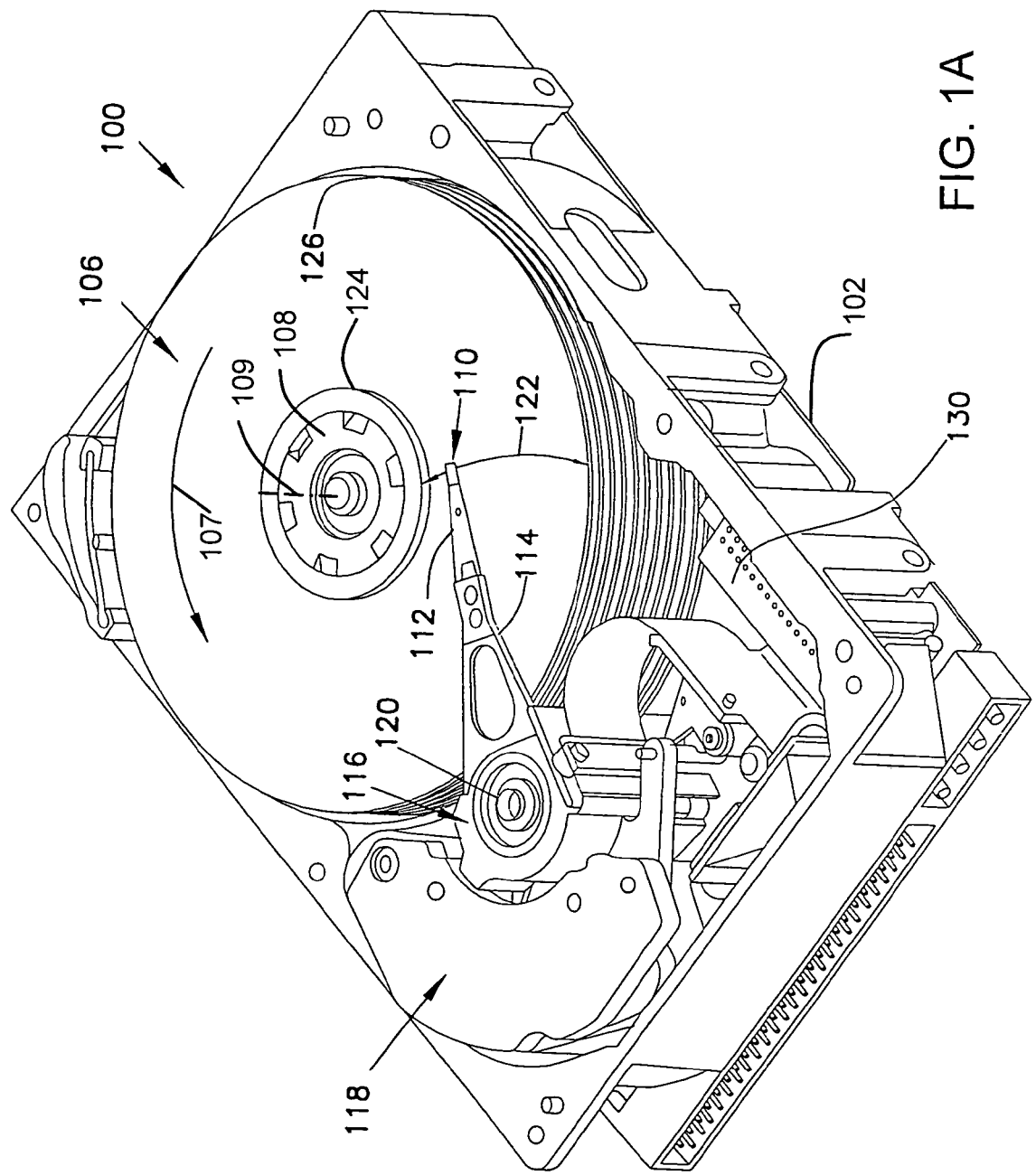
FIG. 1A is an isometric view of a disc drive.

FIG. 1A is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109 in a direction indicated by arrow 107. Each disc surface has an associated disc head slider 110 which is mounted to disc drive 100 for communication with the disc surface. In the example shown in FIG. 1A, sliders 110 are supported by suspensions 112 which are in turn attached to track accessing arms 114 of an actuator 116. The actuator shown in FIG. 1A is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 1B:
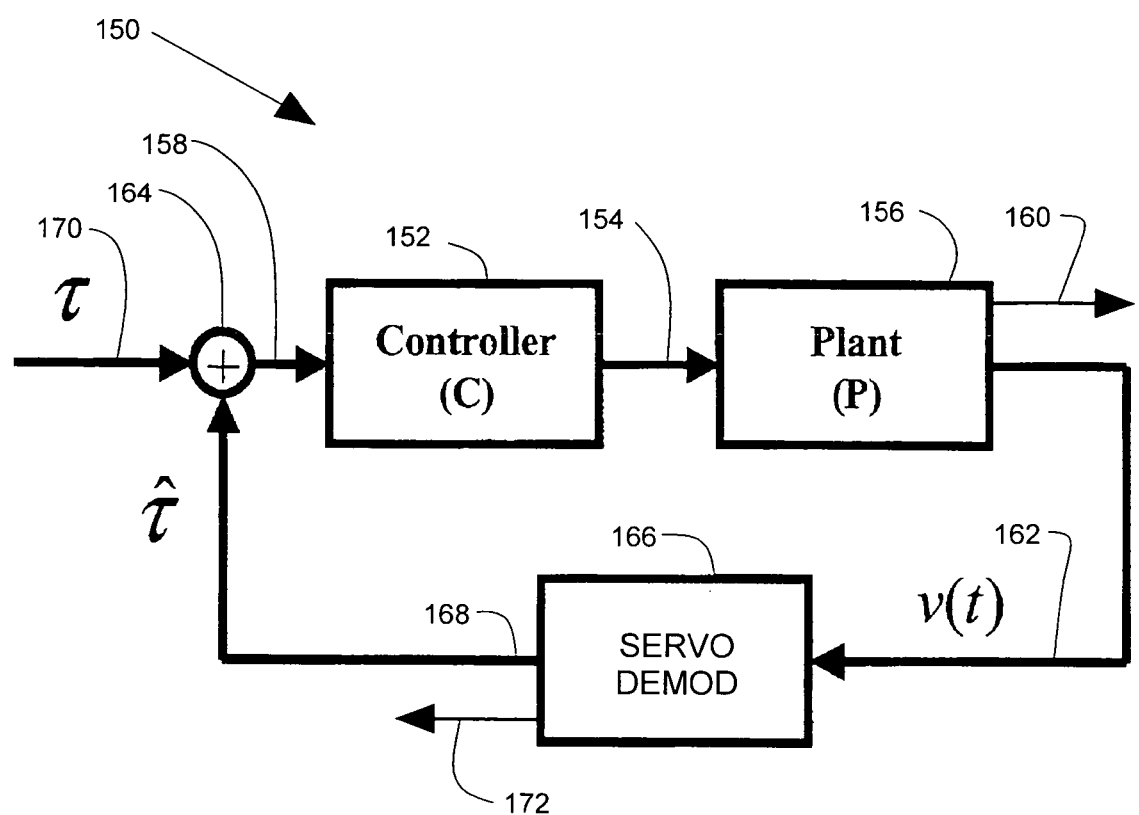
FIG. 1B illustrates a servo system for controlling a head slider position in a disc drive.

FIG. 1B illustrates a servo system 150 for controlling a position 160 of a head slider (such as head slider 110 in FIG. 1A) relative to a track on a disc. Servo system 150 is arranged as a control loop that includes a controller 152 providing a control output 154 to a plant 156. The controller typically comprises an electronic circuit that receives a position error signal (PES), also called an error output 158. The control output 154 typically comprises a voice coil current, or an output to a microactuator that works together with a voice coil motor. The plant 156 typically includes a voice coil motor (such as voice coil motor 118 in FIG. 1A) that moves the head slider to the position 160. The position 160 is sensed by a read head on the head slider. The read head senses servo sectors on discs (such as disc pack 106 in FIG. 1A). The servo sectors include pre-recorded position data for each track. The position data as read by the read head provides a readback signal v(t) 162 to the servo demodulator 166. The servo demodulator 166 includes circuitry that demodulates and decodes the position data and provides a position estimate output $\hat{\tau}$ 168. A summing junction 164 receives a reference position output τ 170 and the position estimate output $\hat{\tau}$ 168 and calculates the difference between τ and $\hat{\tau}$ to provide the error output 158. The reference position output τ 170 represents a desired head position relative to a center of a track that is being read.

The controller 152 controls the plant 156 to reduce the difference between the reference signal τ and its estimate $\hat{\tau}$. The servo demodulator 166 demodulates the position information in v(t) to extract the estimate $\hat{\tau}$ of the reference position signal τ. The controller 152 controls a read/write head (in the plant 156) to change spatial position by moving in response to the position error signal (PES) 158. The plant 156 represents the magnetic recording system whose servo data output v(t) is a readback signal with servo specific position information. The reference signal τ is typically set to zero for track center, but may be other than zero if an offset is required. The servo demodulator 166 extracts the position estimate information within v(t), and outputs $\hat{\tau}$ as an estimate of τ. In order not to increase the loop delay, there is a design objective of keeping the architecture of the servo demodulator 166 simple and fast. There is also a design objective to provide a position estimate $\hat{\tau}$ that has a low error rate, which tends to lead to slower, more complex architecture. It is difficult to achieve a good balance between high speed and low error rate for a particular system. It will be understood by those skilled in the art that the servo demodulator 166 can also provide other estimated outputs (such as Track ID output 172) that indicate a track number for use by other control loops (not shown) that control larger head movement from a previously-used track to a next-desired track during seek operations.

Figure 2:
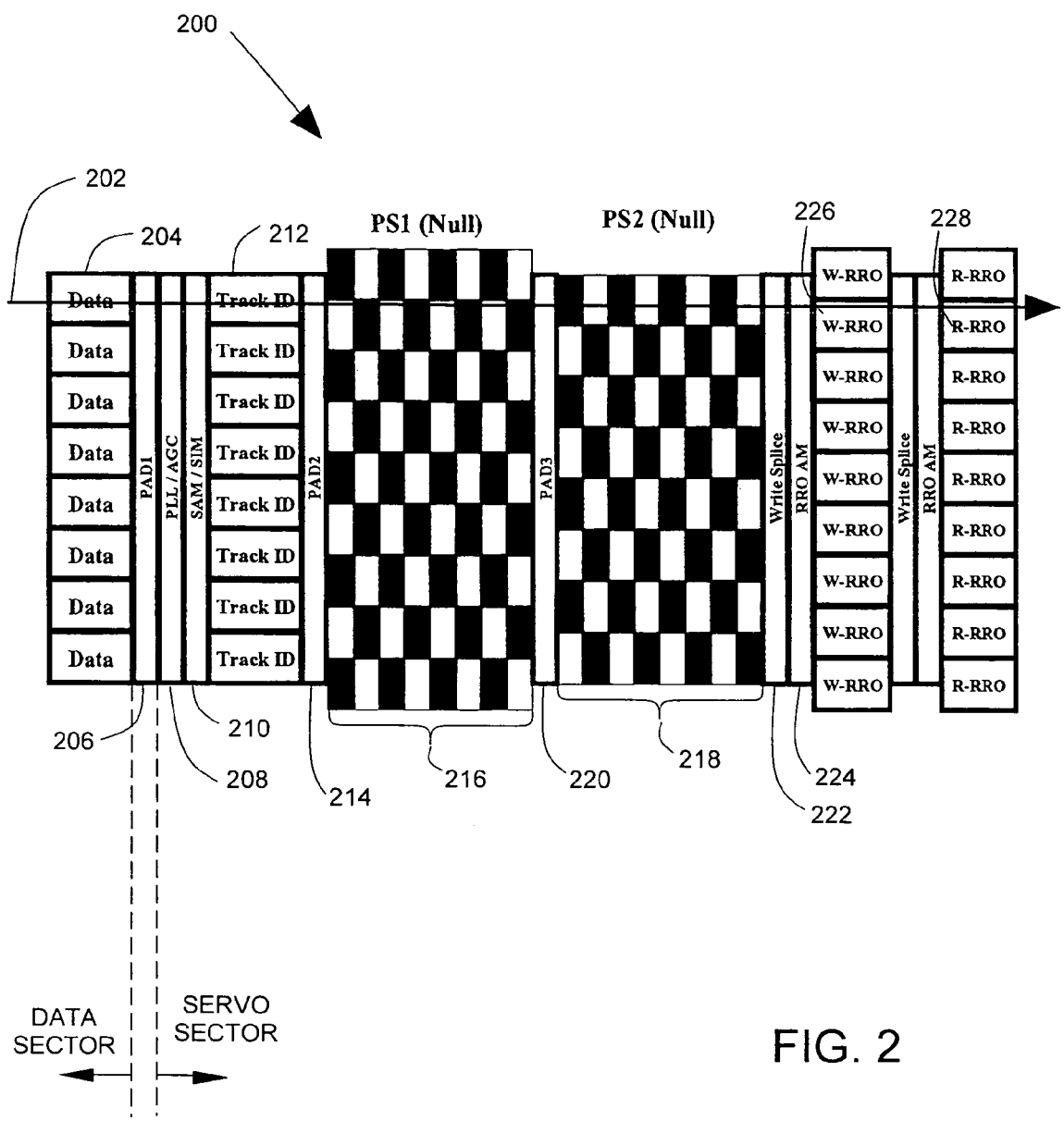
FIG. 2 illustrates servo sector formatting on a disc in a disc drive.

FIG. 2 illustrates a enlarged portion of a typical sector servo (also called embedded servo) format 200 on a disc in a disc drive. It will be understood by those skilled in the art that the portion illustrated in FIG. 2 is greatly enlarged so that the track portions appear to be in a straight lines, but are actually part of a circular tracks on a disc. During disc drive operation, a read/write head moves relative to the disc from left to right along an arc such as arc 202 and produces a readback signal (such as readback signal 162 in FIG. 1B). The readback signal includes data from servo sector fields. The readback signal is then processed by a servo demodulator (such as servo demodulator 166 in FIG. 1B). An exemplary internal structure of a servo demodulator 300 is described below in connection with FIG. 3. Referring now to FIG. 2, as the read head moves along the track 202, it first reads data sector 204 and then the space PAD1 206 and then begins reading the servo sector starting with a PLL/AGC field 208. The data written in the field 208 is the same all along the cross-track direction.

Figure 3:
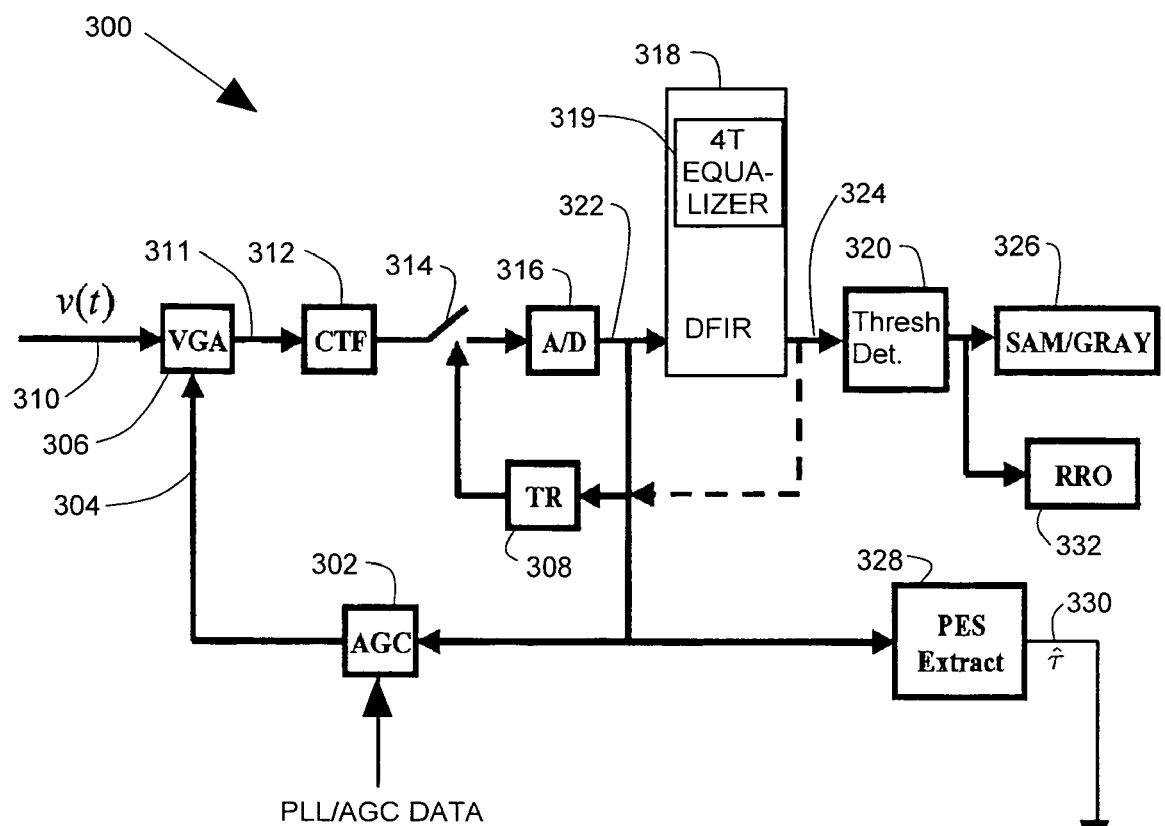
FIG. 3 illustrates a block diagram of a servo demodulator shown in FIG. 1B.

Referring now to FIG. 3, using data received from the PLL/AGC field 208, an automatic gain controller (AGC) 302 (FIG. 3) provides an AGC output 304 that adjusts a gain of a variable gain amplifier (VGA) 306. The variable gain amplifier 306 amplifies the readback signal v(t) 310. The variable gain amplifier 306 provides an amplifier output 311 that couples through a cascade of circuits including continuous time filter (CTF) 312, a sampling switch 314, an analog-to-digital converter (A/D) 316, a digital finite impulse response (DFIR) circuit 318 and a threshold detector 320. An equalizer 319 in the DFIR 318 provides updated outputs every T, but filtering in the DFIR 318 waits for 4T and gets 4 samples to output every other 4T, and the threshold detector 320 operates on signals every other 4T. The equalizer 319 is referred to as a "4T equalizer" since it is optimized for a subsequent filter which waits for 4 samples before providing output. A timing recovery (TR) circuit 308 senses an A/D output 322 (or, alternatively, a DFIR output 324) to recover the phase and frequency offset from the readback signal to control sampling at the sampling switch 314 at the correct sampling instances. Next, a SAM/SIM field 210 (FIG. 2) is read. The SAM/SIM field 210 stores the same data for Servo Address Mark (SAM) or Servo Index Mark (SIM) for all the cross-track direction. The variable gain amplifier 306 and the timing recovery circuit 308 are adjusted prior to reading the SAM/SIM field, and the servo demodulator circuit 300 (FIG. 3) is ready to demodulate the readback data from the SAM/SAM field 210.

Once the SAM/SIM information is detected using the SAM/GRAY circuit 326, the SAM/GRAY circuit 326 then detects the gray-coded Track ID 212 (FIG. 2). Once the Track ID 212 of the next desired track is correctly detected, the magnetic head is presumed to be in the vicinity of the center line of the desired track. After an additional space PAD2 at 214, the head reads Position Signal 1 (PS1) at 216 and Position Signal 2 (PS2) at 218. Fields 216, 218 are separated by another space PAD3 at 220. The servo demodulator circuit 300 (FIG. 3) processes the data in PS1 and PS2 using a PES Extract circuit 328 (FIG. 3) to extract and provide a position estimate output 330 (corresponding to position estimate output 168 in FIG. 1). Usually, the position estimate output 168 (FIG. 1B) and the position error signal 158 (FIG. 1B) or 330 (FIG. 3) are the same value because the reference position output is usually zero. With the use of the position error signal 158 (FIG. 1), the servo system 150 (FIG. 1B) moves the read/write head towards the center of the desired track. After the PS2 field 218 (FIG. 2), a Write Splice space 222 is provided, followed by a Repeatable Run Out (RRO) Address Mark (AM) 224. The address mark 224 is detected with the help of "SAM/GRAY" circuit 326 (FIG. 3), and a W-RRO field 226 associated with the write process (W-RRO) is detected. A read R-RRO field 228 is also detected. An RRO circuit 332 processes R-RRO and W-RRO information to be used during the read or write processes, respectively, to make the final adjustments on the head location against the RRO effects in the system before the head starts writing or reading data sectors.

Figure 4A:
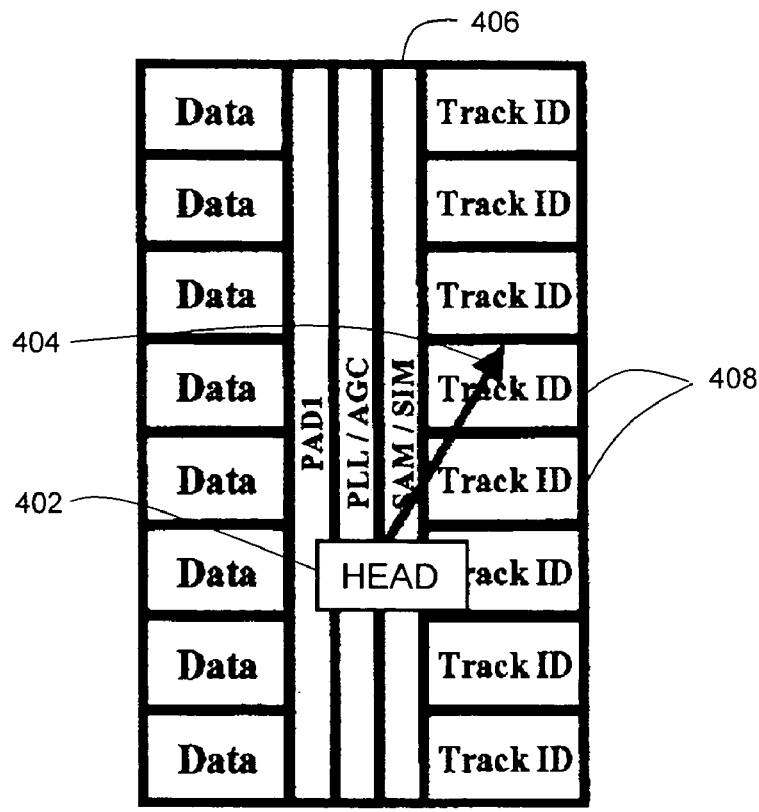
FIG. 4A pictorially illustrates a head slider moving in a cross track direction over servo sector formatting on a disc.

There is a design objective to detect SAM/SIM and gray coded Track IDs as quickly as possible to provide a rapid seek mode of moving a head 402 from a previously used track to a next desired track. As pictorially illustrated in FIG. 4A, during the seek mode, the head 402 moves rapidly in a generally cross-track direction 404 to search for Track ID. The SAM/SIM field 406 and Track ID fields 408 will need to be detected while the head is rapidly moving in a cross-track direction. This movement 404 of the head 402 causes timing offset between radially adjacent servo tracks, and this timing offset is referred to as Radial Incoherence (RI).

Figure 4B:
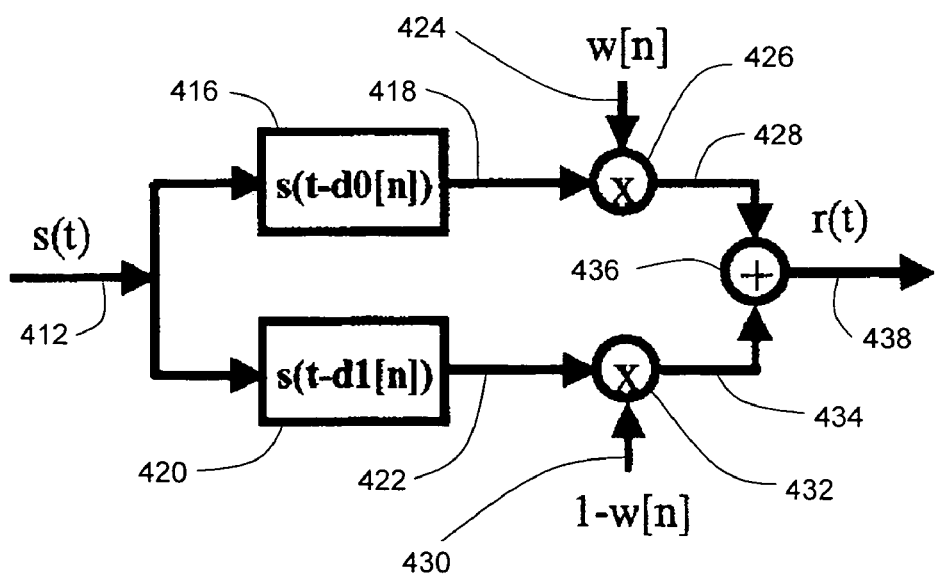
FIG. 4B illustrates a model of radial incoherence (RI) generation due to cross track motion of the head slider.

FIG. 4B illustrates a model of radial incoherence. In FIG. 4B, data in a coherent time sequence in servo fields is represented by an input s(t) at 412, and data that includes radial incoherence is represented by the output r(t) at 438. In this model, $d_o[n]$ and $d_1[n]$ represent time varying delays due to cross-track motion, and w[n] represents time varying weighting. A first portion of the data s(t) is processed by processor 416 which provides an output $s(t-d_o[n])$ at output 418. A second portion of the data s(t) is processed by a processor 420 which provides an output $s(t-d_1[n])$ at output 422. The output 418 is multiplied by weighting factor w[n] 424 in a first multiplier 426 to provide a first multiplier output 428. The output 422 is multiplied by weighting factor 1-w[n] 430 in a second multiplier 432 to provide a second multiplier output 434. The first and second multiplier outputs 428, 434 are combined in an adder 436 to provide the output 438 which includes radial incoherence.

For fixed w[n], the effect of RI can be approximated by a frequency offset which is a function of the difference between $d_o[n]$ and $d_1[n]$. The disc drive is designed to limit RI to a specified range. According to one specification of RI, a maximum phase shift of period T (one clock period) can occur within a time of 50T, which means a maximum frequency offset of 2% into the disc drive.

Figure 5:
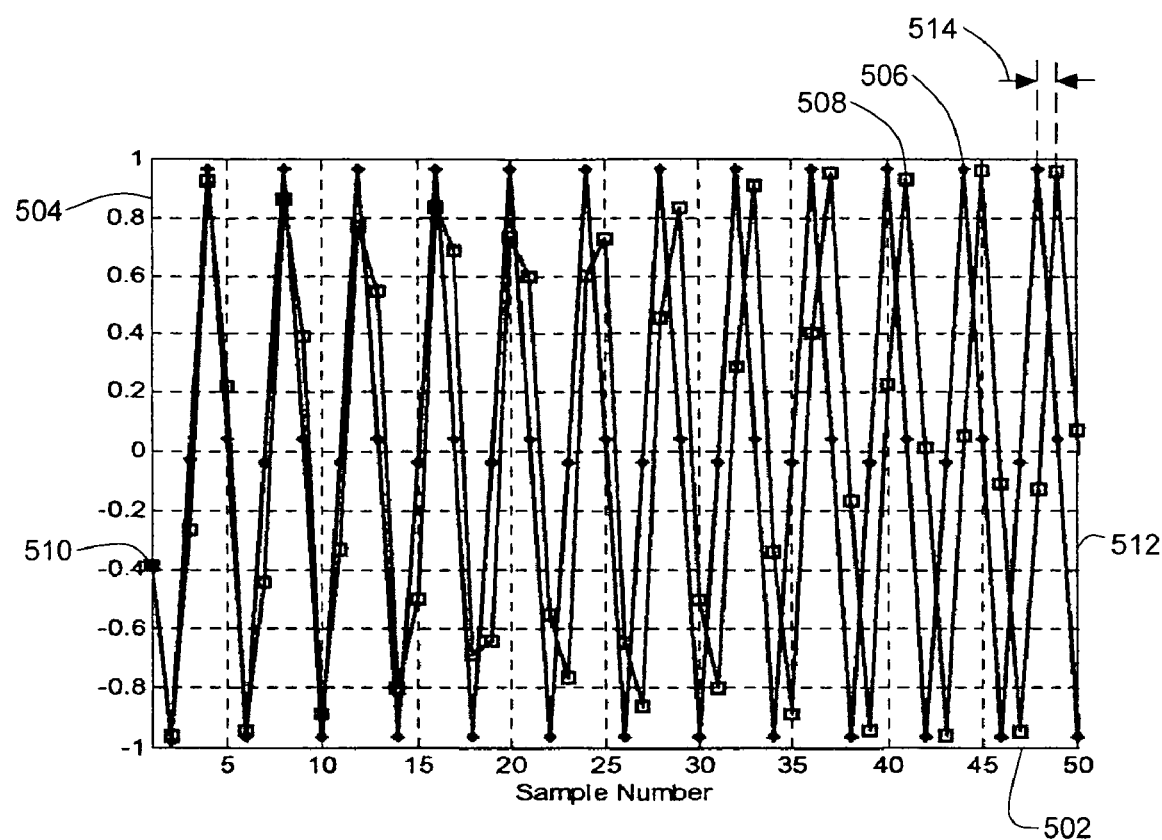
FIG. 5 illustrates a graph of a tone signal with radial incoherence and a tone signal without radial incoherence.

FIG. 5 illustrates a time domain representation of a frequency offset. Offsets due to radial incoherence change the signal shape considerably. In FIG. 5, a horizontal axis 502 represents sample number, or in other words, time. A vertical axis 504 represents voltage amplitude of a test signal or tone. A first waveform 506 (samples indicated by stars) represents a test signal which has not been subjected to radial incoherence. A second waveform 508 (samples indicated by squares) represents the same test signal after it has been subjected to radial incoherence. At a beginning 510 of a read of a servo sector, the first and second waveforms 506, 508 are essentially the same amplitude at any given instant of time. At the end 512 of 50 samples, however, the first waveform 506 lags the second waveform 508 by one sample period 514. The lag is one sample period over fifty sample periods, or 2% frequency offset. In this application, the RI effect is approximated by a frequency offset such as the example described in connection with FIG. 5.

The presence of RI has a big effect on the performance of SAM/SIM and Track ID detection functionalities of servo demodulation architecture, and should be taken care of. There are non-optimal methods for compensating for the specific RI effect illustrated in FIG. 5, as described below in connection with FIGS. 6-7. More optimal solutions for compensating for the RI effect are described in detail below in connection with FIGS. 8-22.

Figure 6:
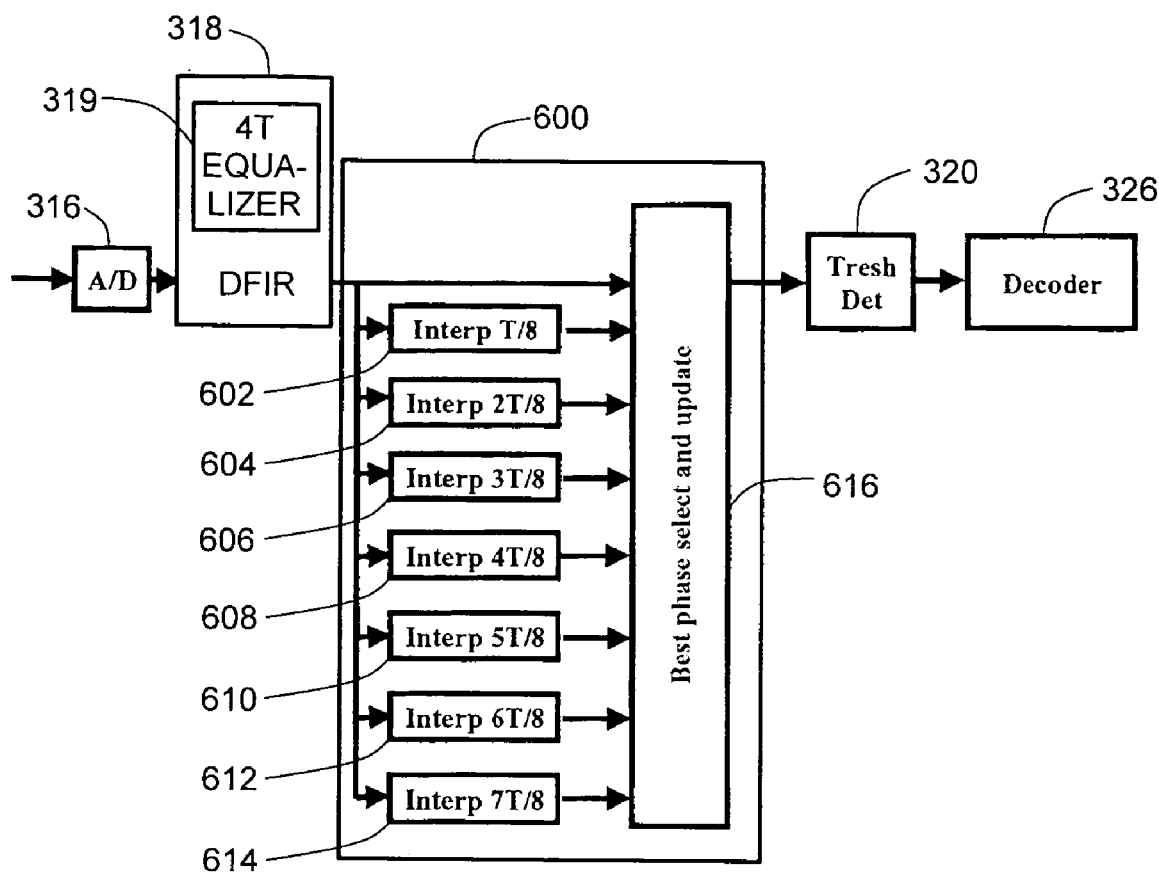
FIG. 6 illustrates a circuit with interpolators for removing radial incoherence.
Figure 7:
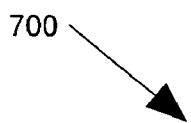
FIG. 7 illustrates a table of tap values for the interpolators illustrated in FIG. 6.

FIG. 6 illustrates a circuit with interpolators 602, 604, 606, 608, 610, 612, 614 that provide less than optimal removal of radial incoherence. FIG. 7 illustrates a table 700 of tap values for the interpolators 602, 604, 606, 608, 610, 612, 614 illustrated in FIG. 6. When radial incoherence is present, an interpolation filter 600 is inserted in cascade between the DFIR 318 (FIG. 3) and the threshold detector 320 (FIG. 3) as illustrated in FIG. 6 in an effort to compensate for radial incoherence.

In the filter 600, parallel branches with different interpolation filters 602, 604, 606, 608, 610, 612, 614 are followed by a best phase select and update circuit 616. The main processes in the filter 600 are as follows:

1. For each SAM/SIM or Track ID field, bit value 0 is mapped to [−1 −1 1 1], and bit value 1 is mapped to [1 1 −1 −1] to get the channel input sequence.

2. Choose the ideal channel response to be [a a −a −a], where a is closely related with the recording channel response, or set the ideal channel response to be [1 1 −1 −1] by adjusting the gain of the system using the Automatic Gain Controller (AGC) circuit 302 in FIG. 3.

3. Find the ideal channel output by using the ideal channel response (2nd item) and the channel input (1st item).

4. Set the form of the 5-tap equalizer to be [f1 f2 1 f2 −f1], and define the range for f1 and f2. For a fixed magnetic recording channel get the sampled equalizer input signals. Find the optimum values of f1 and f2 within their range which minimizes the mean square error of the difference between every other 4 samples of ideal channel output (3rd item) and equalizer output. Fix this equalizer for the whole simulation of interest.

5. Take the equalizer output 4 samples (sampled at baud-rate T) at a time. Use those samples to interpolate the output of the equalizer at T/8, 2T/8, 3T/8, 4T/8, 5T/8, 6T/8, and 7T/8 using 4-tap interpolators. The tap values of the digital interpolators are given in FIG. 7.

6. Process the outputs of the interpolation filters every other 4T using the best phase select and update circuit 616. At the very beginning, compare all the outputs of the interpolation filters corresponding to the first 4 samples of the equalizer output, and chose the interpolation filter whose output has the maximum absolute value. Afterwards, compare the outputs of adjacent sub-phases at every 4T, and lock into the one with larger absolute value.

7. Send the output of the best phase select and update circuit 616 every 4T to the threshold detector.

8. Send the output of the threshold detector to the decoder of interest depending on the field being SAM/SIM or Track ID.

The circuit in FIG. 6 attempts to recover the RI effect using the digital interpolators and a control circuitry afterwards. An equalizer 319 in the DFIR 318 provides an updated outputs every T, but the filter 600 waits for 4T and gets 4 samples to output every other 4T, and the threshold detector operates on signals every other 4T. The equalizer 319 is referred to as a "4T equalizer" since it is optimized for a subsequent filter which waits for 4 samples. As can be seen from FIG. 6, the filter 600 uses interpolation filters to recover RI effect, and then employs a threshold detector to detect the signal. The results with the filter 600 are less than optimal.

Figure 8:
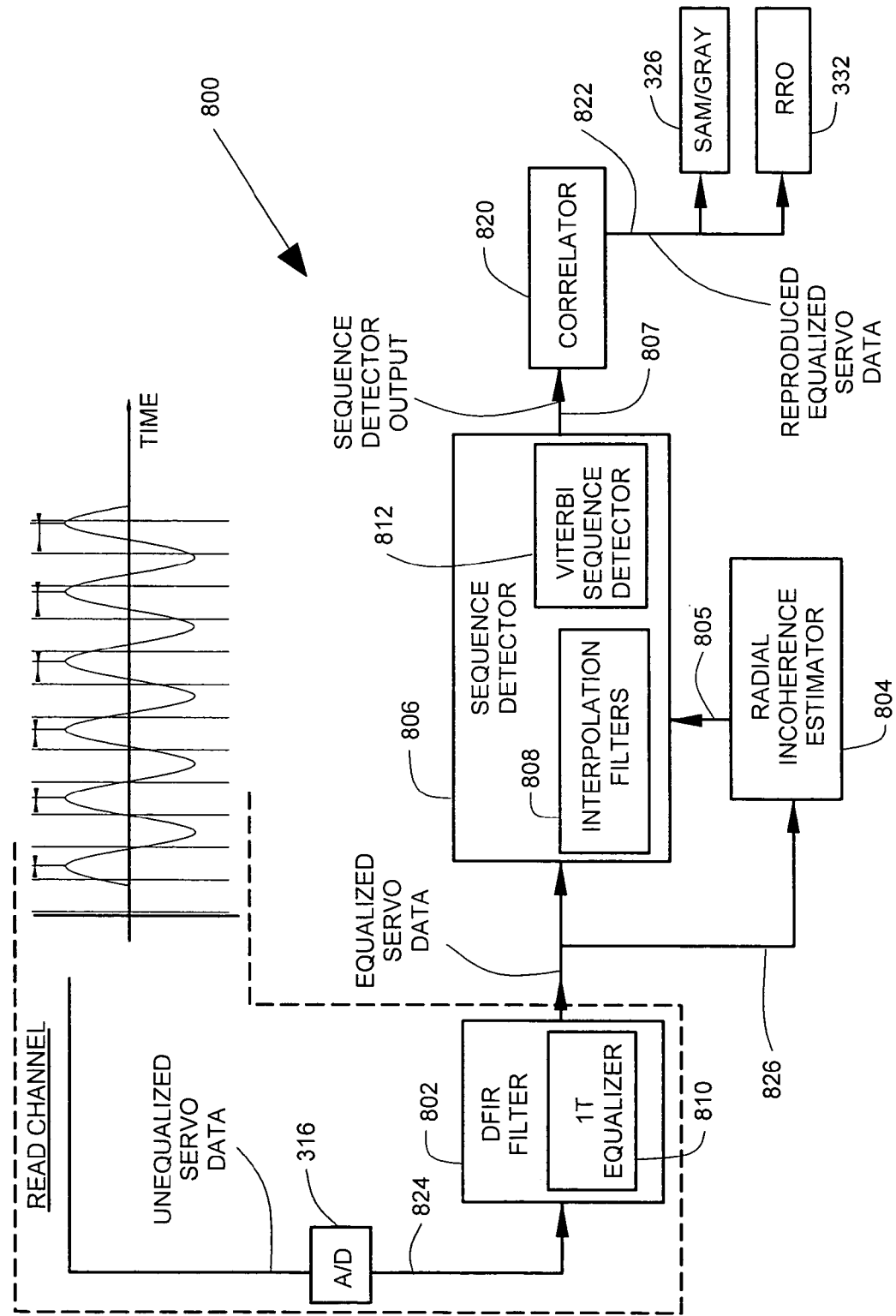
FIG. 8 illustrates a circuit with a DFIR filter and a radial incoherence estimator for removing radial incoherence.

FIG. 8 illustrates a circuit 800 with a DFIR filter 802 and a radial incoherence estimator 804. The circuit 800 is insertable in cascade between the ADC stage 316 (FIG. 3) and the SAM/GRAY code circuit 326 (FIG. 3) in place of the DFIR filter 318 (FIG. 3) and the threshold detector 320 of FIG. 3. The circuit 800 removes radial incoherence and provides a desired, more optimal combination of high speed, low complexity and low error rate in comparison with the arrangement described above in connection with FIGS. 6-7.

In FIG. 8, a sequence detector 806 is used, and a threshold detector such as threshold detector 320 in FIG. 6 is not needed. Interpolation filters 808 are implemented as part of the sequence detector 806, and a best phase select and update block such as block 616 in FIG. 6 is not needed in FIG. 8. Below, the functionalities of these blocks in FIG. 8 is set forth in more detail.

The internal arrangement of a specially adapted equalizer 810 in the DFIR filter 802 is described below in connection with FIG. 9. The sub-optimal arrangement shown in FIGS. 6-7 works on samples of equalizer output at every 4T clock periods (4T). For this reason, the equalizer of FIGS. 6-7 has an architecture that minimizes the difference between the samples of ideal channel output and equalizer output every other 4T, not every T. To satisfy this, the equalizer of FIGS. 6-7 applies a brute force search algorithm to find the optimum equalizer coefficients within their predefined ranges.

However, in the arrangement of FIG. 8, equalizer 810 is used to provide output samples at every T-clock. The equalizer 810 closely follows the ideal channel output at every T. Below the problem is described in more detail, and a solution is described in more detail for an optimum analytical expression for the equalizer, instead of applying a brute force search algorithm.

In FIG. 8, the servo track sensing system 800 receives equalized servo data 826 received from a servo demodulator in a read channel. The system 800 corrects for radial incoherence in the servo data. The radial incoherence estimator 804 receives the equalized servo data, and provides a radial incoherence estimate 805. The sequence detector 806 receives the equalized servo data and the radial incoherence estimate 805. The sequence detector 806 provides a sequence detector output 807. A correlator 820 receives the sequence detector output 807 and provides correlator output data 822 with a reduced level of errors due to radial incoherence. The FIR filter 802 receives unequalized servo data 824 and provides the equalized servo data 826. The FIR filter 802 includes the equalizer 810 that equalizes over a single clock cycle (1T). The sequence detector 806 comprises a Viterbi sequence detector 812 and interpolation filters 808. The unequalized servo data 826 preferably comprises track error data.

Figure 9:
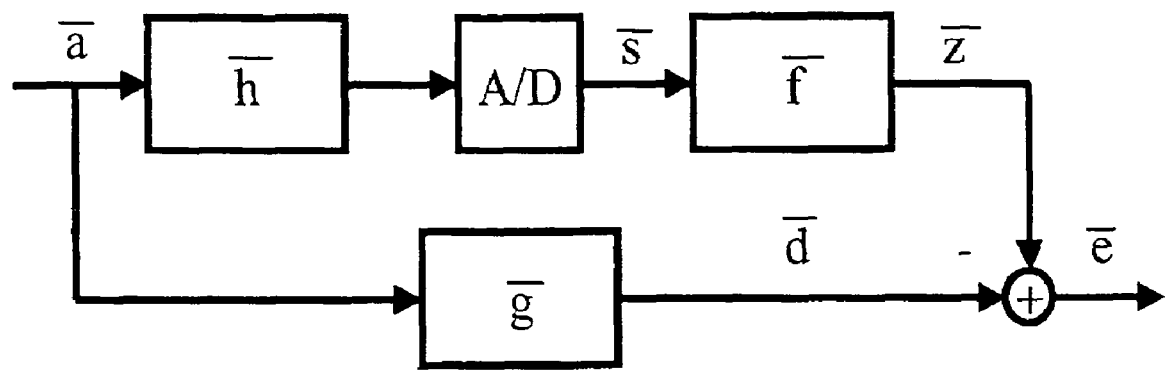
FIG. 9 illustrates a block diagram of the design of an equalizer illustrated in FIG. 8.

FIG. 9 illustrates the architecture design of equalizer coefficients for the equalizer 810. In FIG. 9, $\bar{a}$ represents the channel input sequence, $\bar{h}$ represents the magnetic recording architecture with all noise and distortions, and $\bar{f}$ and $\bar{g}$ are the equalizer and the target response, respectively. The same constraints are applied for the equalizer and target response as mentioned in the previous section, i.e., the target is fixed to [a a −a −a], and the equalizer is in the form [f1 f2 1 f2 −f1]. For this example, a cost function can be set to:

$$\sigma_e^2 = E[|\bar{e}|^2] - 2\bar{\lambda}_g^T(\hat{C}_g^T\bar{g} - \bar{\alpha}_g) - 2\bar{\lambda}_f^T(\hat{C}_f^T\bar{f} - \bar{\alpha}_f) \qquad \text{Equation 1}$$

where $\bar{e}$ is the error vector in FIG. 9, $\hat{C}_g$ and $\hat{C}_f$ are the constraint matrices which impose the desired constraints on target and equalizer responses respectively, and $\bar{\alpha}_g$ and $\bar{\alpha}_f$ store the values of the specified constraints. After some algebra, the following 4 sets of equations are obtained by taking the derivative of the cost function in Equation 1 with respect to the elements of the vectors $\bar{f}$, $\bar{g}$, $\bar{\lambda}_f$, $\bar{\lambda}_g$:

$$\hat{R}^{ss}\bar{f} = \hat{R}^{sa}\bar{g} + \bar{\lambda}_f^T\hat{C}_f^T, \qquad \text{Equation 2}$$

$$\hat{R}^{aa}\bar{g} = \hat{R}^{as}\bar{f} + \bar{\lambda}_g^T\hat{C}_g^T, \qquad \text{Equation 3}$$

$$\hat{C}_f^T\bar{f} = \bar{\alpha}_f, \qquad \text{Equation 4}$$

$$\hat{C}_g^T\bar{g} = \bar{\alpha}_g, \qquad \text{Equation 5}$$

where $$\hat{R}^{ss} = E\{\hat{S}^T\hat{S}\}$$

$$\hat{R}^{aa} = E\{\hat{A}^T\hat{A}\}$$

$$\hat{R}^{sa} = E\{\hat{S}^T\hat{A}\}$$

$$\hat{R}^{as} = E\{\hat{A}^T\hat{S}\} \qquad \text{Equation 6}$$

with matrices $$\hat{S} = \begin{pmatrix} \bar{s}(0) & 0 & 0 & \cdots & 0 \\ \bar{s}(1) & \bar{s}(0) & 0 & \cdots & 0 \\ \bar{s}(2) & \bar{s}(1) & \bar{s}(0) & \cdots & 0 \\ \vdots & \vdots & \vdots & \vdots & \vdots \\ \bar{s}(N-1) & \bar{s}(N-2) & \bar{s}(N-3) & \cdots & \bar{s}(0) \\ \vdots & \vdots & \vdots & \vdots & \vdots \\ \bar{s}(L-1) & \bar{s}(L-2) & \bar{s}(L-3) & \cdots & \bar{s}(L-N+1) \end{pmatrix} \qquad \text{Eq. 7}$$

and $$\hat{A} = \begin{pmatrix} \bar{a}(0) & 0 & 0 & \cdots & 0 \\ \bar{a}(1) & \bar{a}(0) & 0 & \cdots & 0 \\ \bar{a}(2) & \bar{a}(1) & \bar{a}(0) & \cdots & 0 \\ \vdots & \vdots & \vdots & \vdots & \vdots \\ \bar{a}(M-1) & \bar{a}(M-2) & \bar{a}(M-3) & \cdots & \bar{a}(0) \\ \vdots & \vdots & \vdots & \vdots & \vdots \\ \bar{a}(L-1) & \bar{a}(L-2) & \bar{a}(L-3) & \cdots & \bar{a}(L-M+1) \end{pmatrix} \qquad \text{Eq. 8}$$

composed with the elements of equalizer input $\bar{s}$ and channel input $\bar{a}$ in FIG. 9. From Equation 4, $\hat{C}_f$ and $\bar{\alpha}_f$ are:

$$\hat{C}_f^T = \begin{pmatrix} 0 & 0 & 1 & 0 & 0 \\ 0 & 1 & 0 & -1 & 0 \\ 1 & 0 & 0 & 0 & 1 \end{pmatrix}, \quad \overline{\alpha}_f = [1\ 0\ 0]^T \qquad \text{Equation 9}$$

in order to make sure that the equalizer has the form [f1 f2 1 f2 −f1]. Similarly, choosing $\hat{C}_g$ and $\overline{\alpha}_g$ as $$\hat{C}_g^T = \begin{pmatrix} 1 & 0 & 0 & 0 \\ 0 & 1 & 0 & 0 \\ 0 & 0 & 1 & 0 \\ 0 & 0 & 0 & 1 \end{pmatrix}, \quad \overline{\alpha}_g = [aa\ -a\ -a]^T \qquad \text{Equation 10}$$

sets the target response to be [a a −a −a] from Equation 5. Using these values of $\hat{C}_g$, $\overline{\alpha}_g$, $\hat{C}_f$, and $\overline{\alpha}_f$, and defining the following new variables $$\hat{K}_f = \hat{R}^{ss} - \hat{R}^{sa}(\hat{R}^{aa})^{-1}\hat{R}^{as}$$

$$\hat{K}_g = \hat{R}^{aa} - \hat{R}^{as}(\hat{R}^{ss})^{-1}\hat{R}^{sa}$$

$$\hat{A} = \hat{C}_g^T \hat{K}_g^{-1} \hat{R}^{as}(\hat{R}^{ss})^{-1} \hat{C}_f$$

$$\hat{B} = \hat{C}_g^T \hat{K}_g^{-1} \hat{C}_g$$

$$\hat{C} = \hat{C}_f^T \hat{K}_f^{-1} \hat{R}^{sa}(\hat{R}^{aa})^{-1} \hat{C}_g$$

$$\hat{D} = \hat{C}_f^T \hat{K}_f^{-1} \hat{C}_f \qquad \text{Equation 11}$$

the expressions for $\overline{\lambda}_f$ and $\overline{\lambda}_g$ can be written as $$\overline{\lambda}_f = (\hat{D} - \hat{C}\hat{B}^{-1}\hat{A})^{-1}(\overline{\alpha}_f - \hat{C}\hat{B}^{-1}\overline{\alpha}_g) \qquad \text{Equation 12}$$

$$\overline{\lambda}_g = \hat{B}^{-1}(\overline{\alpha}_g - \hat{A}\overline{\lambda}_f) \qquad \text{Equation 13}$$

Finally, the analytical expression for the optimum equalizer $\overline{f}$ which minimizes the cost function in Equation 1 can be written as:

$$\overline{f} = \hat{K}_f^{-1} \hat{R}^{sa}(\hat{R}^{aa})^{-1} \hat{C}_g \overline{\lambda}_g + \hat{K}_f^{-1} \hat{C}_f \overline{\lambda}_f \qquad \text{Equation 14}$$

A new detector block is based on combining a Viterbi sequence detector 812 with the interpolation filters 808. The equalizer output is sampled at each Viterbi detector branch with different sampling phase offsets using the interpolation filters.

The detector that minimizes the error probability of an entire sequence is known as a maximum likelihood sequence detector (MLSD). The MLSD which is implemented based on the Viterbi algorithm chooses the input sequence $\overline{a}$ that maximizes the likelihood metric $$p(\overline{z}|\overline{a}) = \frac{1}{\left(\sqrt{2\pi\sigma_n^2}\right)^{L+\mu}} \exp\left\{\frac{-1}{2\sigma_n^2} \sum_{k=0}^{L+\mu-1} |\overline{z}_k - \overline{d}_k|^2\right\}, \qquad \text{Equation 15}$$

where $\overline{z}$ is the equalizer output, $\overline{d}$ is the ideal channel output (i.e., output of the target response in FIG. 10), L is the length of the input sequence, μ is the channel memory, and $\sigma_n$ represents the standard deviation of the additive noise in the system. Maximizing Equation 15 is equivalent to minimizing the following likelihood metric $$\sum_{k=0}^{L+\mu-1} |\overline{z}_k - \hat{d}_k|^2. \qquad \text{Equation 16}$$

This metric can be minimized by searching the path through the trellis with minimal metric. The metric of the path (or the path metric) is defined as the sum of the metrics of all its branches, and the branch metric $\rho_k^{(p,q)}$ for a transition from state (p) to state (q) is defined to be $$\rho_k^{(p,q)} = |\overline{z}_k - \hat{d}_k^{(p,q)}|^2. \qquad \text{Equation 17}$$

Note that $\overline{z}_k$, which is used to compute the branch metric of the conventional Viterbi algorithm, is the same for all state transitions. The "New Detector" block works in a similar fashion as the viterbi algorithm does, except that there is an additional timing update operation and the k-th observation $\overline{z}_k$ will be different for each state transition. This is because each state has different sampling phase offset. With the Muller and Mueller timing error detector (MMTED), the estimated timing error, $\hat{\epsilon}_k$, is computed as $$\hat{\epsilon}_k = \overline{y}_k \hat{d}_{k-1} - \overline{y}_{k-1} \hat{d}_k, \qquad \text{Equation 18}$$

where $\overline{y}_k = \overline{z}(k+\tau_k)$. Equation 18 needs samples at time k and k−1 to compute the estimated timing error at time k.

Figure 10:
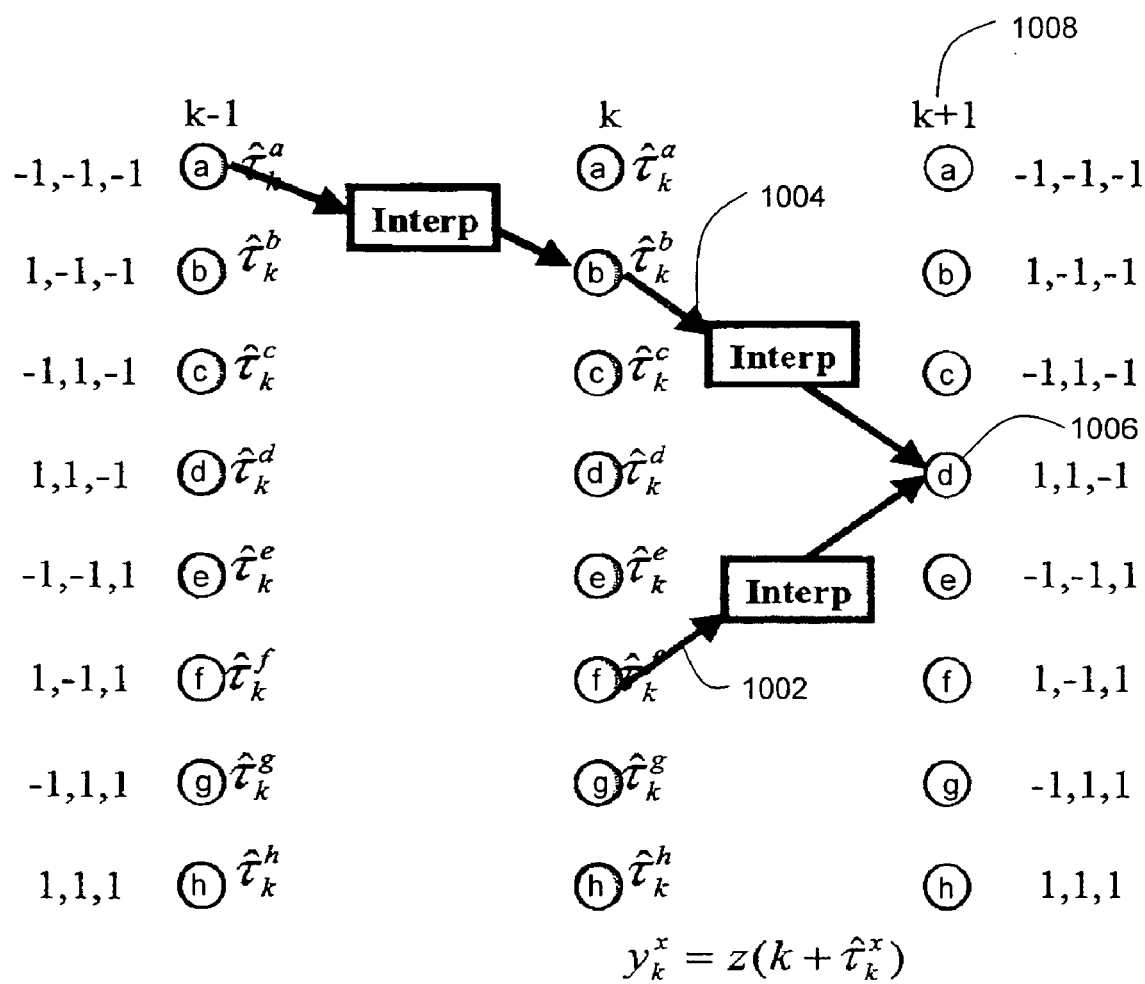
FIG. 10 illustrates a process in a viterbi sequence detector in FIG. 8.

FIG. 10 illustrates how the "New Detector" works. There are two transitions 1002, 1004 arriving at state (d) 1006 at time k+1 at 1008. Two observations $\overline{y}_k^{(b,d)}$ and $\overline{y}_k^{(f,d)}$ are obtained by sampling the signal $\overline{z}_k$ using the sampling phase offsets $\hat{\tau}_k^{(b)}$ and $\hat{\tau}_k^{(f)}$, respectively. First, the values of those phase offsets are checked, and choose the most appropriate interpolation filter in FIG. 7 to find the values of $y_k^{(b,d)} = \overline{z}(k+\hat{\tau}_k^{(b)})$, and $y_k^{(f,d)} = \overline{z}(k+\hat{\tau}_k^{(f)})$ as accurately as possible. Then, the branch metrics associated with these two transitions 1002, 1004 can be written as $$\rho_k^{(b,d)} = |\overline{y}_k^{(b,d)} - \overline{d}_k^{(b,d)}|^2 \qquad \text{Equation 19}$$

and $$\rho_k^{(f,d)} = |\overline{y}_k^{(f,d)} - \overline{d}_k^{(f,d)}|^2, \qquad \text{Equation 20}$$

where the channel outputs are $\hat{d}_k^{(b,d)} = 4$ and $\hat{d}_k^{(f,d)} = 2$. The survivor path up to state (d) 1006 at time k+1 is chosen by selecting the path that results in the minimum path metric, i.e., $$\Phi_{k+1}^{(d)} = \min\{\Phi_k^{(b)} + \rho_k^{(b,d)}, \Phi_k^{(f)} + \rho_k^{(f,d)}\}. \qquad \text{Equation 21}$$

Suppose the transition 1004 from state (b) to state (d) is chosen, the state (d) 1006 will perform timing update to get $\hat{\tau}_{k+1}^{(d)}$ using the information obtained from the survivor path up to state (d) at time k+1. The $\hat{\tau}_{k+1}^{(d)}$ is obtained by first computing the estimated timing error associated with the transition (b, d) at the k-th stage, i.e., $$\epsilon_k^{(b,c)} = \overline{y}_k^{(b,d)} \overline{d}_{k-1}^{(a,b)} - \overline{y}_{k-1}^{(a,b)} \overline{d}_k^{(b,d)}, \qquad \text{Equation 22}$$

where $\overline{y}_k^{(b,d)}$, $\overline{d}_{k-1}^{(a,b)}$, $\overline{y}_{k-1}^{(a,b)}$ and $\overline{d}_k^{(b,d)}$ are obtained from the survivor path. Then, the "New Detector" updates the next frequency error $\hat{\theta}_k^{(d)}$, and the next sampling phase offset $\hat{\tau}_{k+1}^{(d)}$ for state (d) using the 2nd-order PLL update equations:

$$\hat{\theta}_k^{(d)} = \hat{\theta}_{k-1}^{(b)} + \beta \epsilon_k^{(b,d)} \qquad \text{Equation 23}$$

$$\hat{\tau}_{k+1}^{(d)} = \hat{\tau}_k^{(b)} + \alpha \epsilon_k^{(b,d)} + \hat{\theta}_k^{(d)}, \qquad \text{Equation 24}$$

where $\alpha$ and $\beta$ are the parameters for the timing loop.

This is continued according to the viterbi algorithm for all states until the end of the received sequence. Eventually, the decision is made by choosing the survivor path that has the minimum cost. Therefore, the "New Detector" algorithm can be summarized as follows:

1) Compare all the outputs of the interpolation filters corresponding to the first 4 samples of the equalizer output, and initialize the interpolation filters of all branches to the one whose output has the maximum absolute value, 2) For $k=0,1,2,\ldots,L+\mu-1$
   for $q=0, 1, \ldots, Q-1$ (Q is the number of states, which is 8 in our example)
   Consider two transitions arriving at state (q) at time $k+1$, i.e., (s, q) and (p, q) where $\{s,p\} \in \{0, 1, \ldots, Q-1\}$,
   Compute two branch metrics $\rho_k^{(s,q)}$ and $\rho_k^{(p,q)}$,
   Update the path metric: $\Phi_{k+1}^{(q)} = \min\{\Phi_k^{(s)} + \rho_k^{(s,q)}, \Phi_k^{(p)} + \rho_k^{(p,q)}\}$
   Suppose the transition (p,q) is chosen to be a survivor path, then update the frequency error $\hat{\theta}_k^{(q)}$ and the next sampling phase offset $\hat{\tau}_{k+1}^{(q)}$
   Find the interpolation filter corresponding to the $\hat{\tau}^{k+1(q)}$ within the filters in FIG. 7, end
   end 3) $\hat{\tau}$ and $\hat{a}$ are obtained from the survivor path that has the minimum path metric.

The timing loop parameters $\alpha$ and $\beta$ in Equation 24 are functions of the amount of RI and the other noise sources. If the effect of RI is less, choosing $\alpha$ and $\beta$ small will help reducing the effect of other noise sources in the timing loop. However, if the RI amount is large, then increasing the $\alpha$ and $\beta$ values will help recovering the RI effect, but will also increase the effects of other noise sources into the timing loop. Thus, for a given system, the choice of $\alpha$ and $\beta$ is important.

Thus, a block is desired which estimates the amount of RI in the system, and adjusts the loop parameters $\alpha$ and $\beta$, accordingly. There are a number of ways of designing this block. Some examples include:

Method 1: During SAM/SIM field, take the projections of the equalizer output onto the 2 predetermined Hadamard transform matrix rows. Compare the projected values of the signal with each other, and decide if there is small or large RI in the system. Then, choose the $\alpha$ and $\beta$ values accordingly. During the Track ID field of the sector format, fix the estimated RI amount.

Method 2: Again during SAM/SIM field, instead of taking the projection of the equalizer output onto Hadamard Transform matrix rows, it can be projected to a signature signal. This signature signal is the one which corresponds to readback signal corresponding to SAM or SIM field with no RI effect. If there is no RI in the system, this projection will have the maximum value. When the amount of RI increases, this value decreases, and the amount of RI in the system can be computed.

Method 3: This block can be combined with the "New Detector" block. The combined block includes as many "New Detector" architectures in itself as the number of precision desired in quantizing the RI effect. For example, if one only wants to differentiate between small and large RI effects, it will then have two "New Detector" architectures. The first set will be equipped with $\alpha$ and $\beta$ values chosen for small RI, and the second set employs the values for large RI. Then the path which minimizes the overall path metric is chosen.

The complexity and the performances of the methods increase from top to bottom. In other words, although the 3rd Method is the most complex, it should yield the best performance among the three. Method 1, however, is preferred as requiring the least complexity with sufficient performance.

The "New Detector" block outputs every T-clock (T). However, the blocks after the detector need signals only every other 4T. Thus, there are more signals at the output of the detector than needed by the blocks after the detector. There are a number of ways to process the extra signals. Two example methods are:

Method 1: Here, it is assumed that hard decisions at the output of the "New Detector" block. In this case, the "Correlator" block takes 4 samples at a time from the output of the detector. Each of these signals is equal to either 1 or −1, and vector of 4 samples [d1 d2 d3 d4] correspond to only [−1 −1 1 1] or [1 1 −1 −1] (refer to the first item in the description of the sub-optimal architecture). Those 4 samples are correlated with [−1 −1 1 1] and [1 1 −1 −1]. If $c_0 = d3+d4-d1-d2$ is larger than $c_1 = d1+d2-d3-d4$ then [d1 d2 d3 d4] are set to be [−1 −1 1 1]], or else [d1 d2 d3 d4] are set to be [1 1 −1 −1].

Method 2: The "New Detector" block is designed as a variant of Viterbi detector, and hence outputting hard decisions (i.e., either +1 or −1). However, it can also be designed so that it outputs real numbers, like log likelihood ratios as in Soft Output Viterbi Algorithm (SOVA) or in BCJR algorithm. These log likelihood numbers can also be considered as reliability information for the decisions of the detector. These numbers being closer to zero means the decision will be less reliable. Here, a similar algorithm as in Method 1 is followed, and also incorporate the reliability information about the detected bits. Four samples [d1 d2 d3 d4] are taken at a time (this time log likelihood ratios, not hard decisions) from the output of the soft detector. The signs of the decisions are checked. If the signs are either [−1 −1 1 1] or [1 1 −1 −1] pattern, nothing is done and then an output −1 or +1 is provided according to the pattern being [−1 −1 1 1] or [1 1 −1 −1], respectively. If the signs of [d1 d2 d3 d4] don't match with one of the two desired patterns, the signs of the decisions are toggled one by one, starting from the least reliable one, until the signs match with one of the patterns. Then, an output −1 or −1 is provided according to the ending pattern.

Here, it is assumed that the "New Detector" outputs hard decisions. The first method described above is used throughout "Simulation results" described below.

Figure 11A:
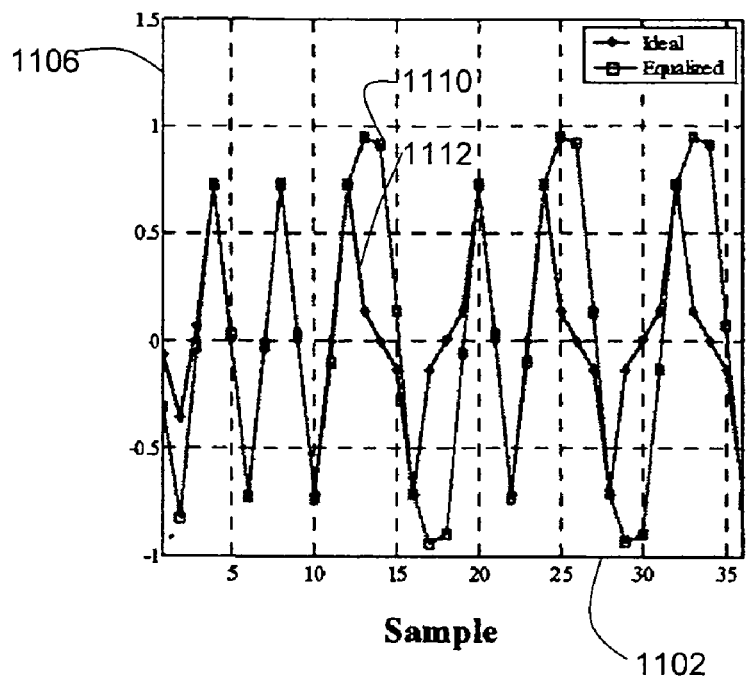
FIG. 11A illustrates an equalizer output for an equalizer in FIG. 6.
Figure 11B:
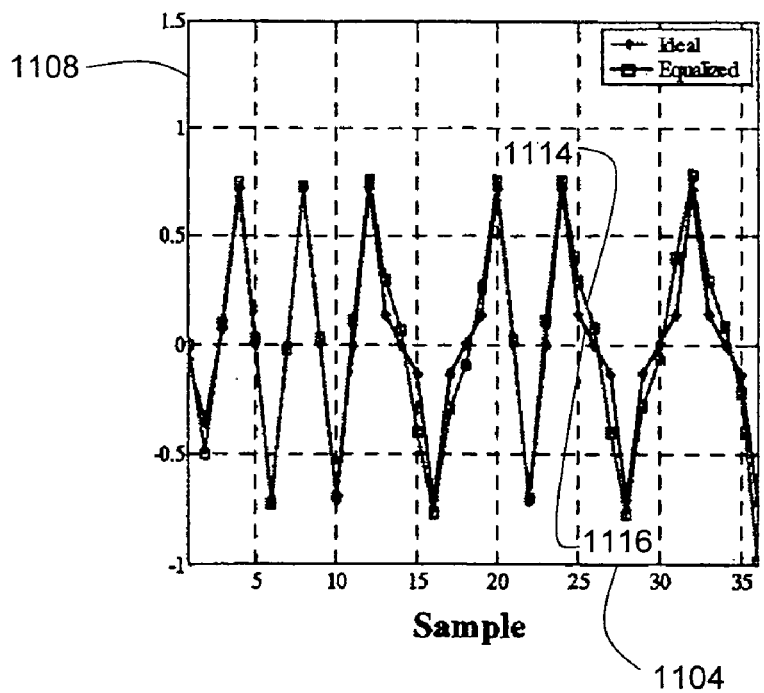
FIG. 11B illustrates an equalizer output for an equalizer in FIG. 8.

The following compares the present architecture of FIG. 8 with the sub-optimal architecture of FIGS. 6-7. To compare the equalizers, the recording system is set to be perpendicular magnetic recording with Normalized Density (ND) equal to 1.5 in presence of only electronic noise with Signal-to-Noise Ratio to be 50 dB, and no Radial Incoherence (RI). It is assumed that SAM symbols have values equal to [0 0 0 1 0 0 1 0 1]. The equalizers are then compared. The equalizer coefficients, together with the ideal channel output and the signal at the output of sub-optimal equalizer of FIGS. 6-7 and the present equalizer of FIG. 8 are shown in FIGS. 11A, 11B. The targets are the same for both the 2 equalizers, and the equalizer tap coefficients satisfy the constraints imposed on them. As can be seen from FIGS. 11A, 11B, the FIG. 6 equalizer minimizes the difference of the equalizer output and the ideal channel output at every 4T. However, the equalizer designed with the new method minimizes the differences between the signals at every T.

In FIGS. 11A, 11B, the horizontal axes 1102, 1104 represent sample number or, in other words, time. The vertical axes 1106, 1108 represent amplitudes of equalizer outputs. FIG. 11A compares an output 1110 of a sub-optimal equalizer (FIG. 6) to an ideal equalizer response 1112. It can be seen from FIG. 11A that there are large deviations from an ideal equalizer response. FIG. 11B compares an output 1114 of the equalizer 810 (FIG. 8) to an ideal equalizer response 1116. It can be seen from FIG. 11B that the response of equalizer 810 is very close to an ideal response.

Figure 12:
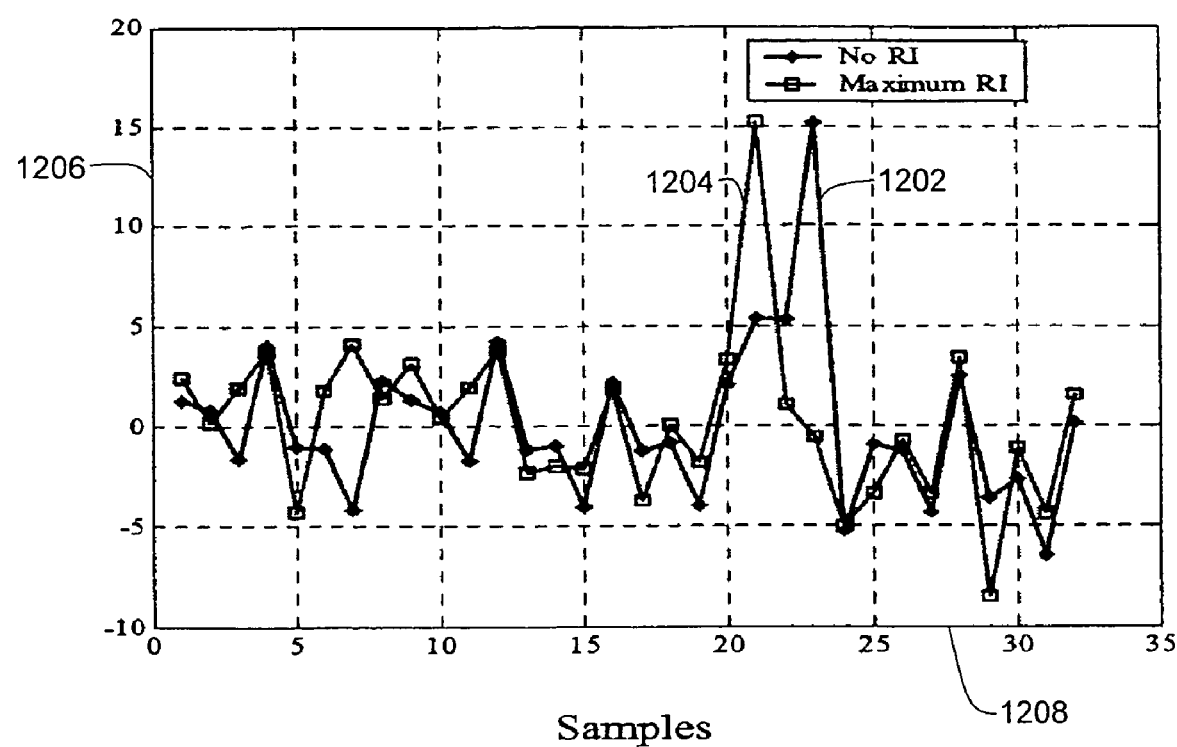
FIG. 12 illustrates Hadamard domain representations with and without radial incoherence.
Figure 13A:
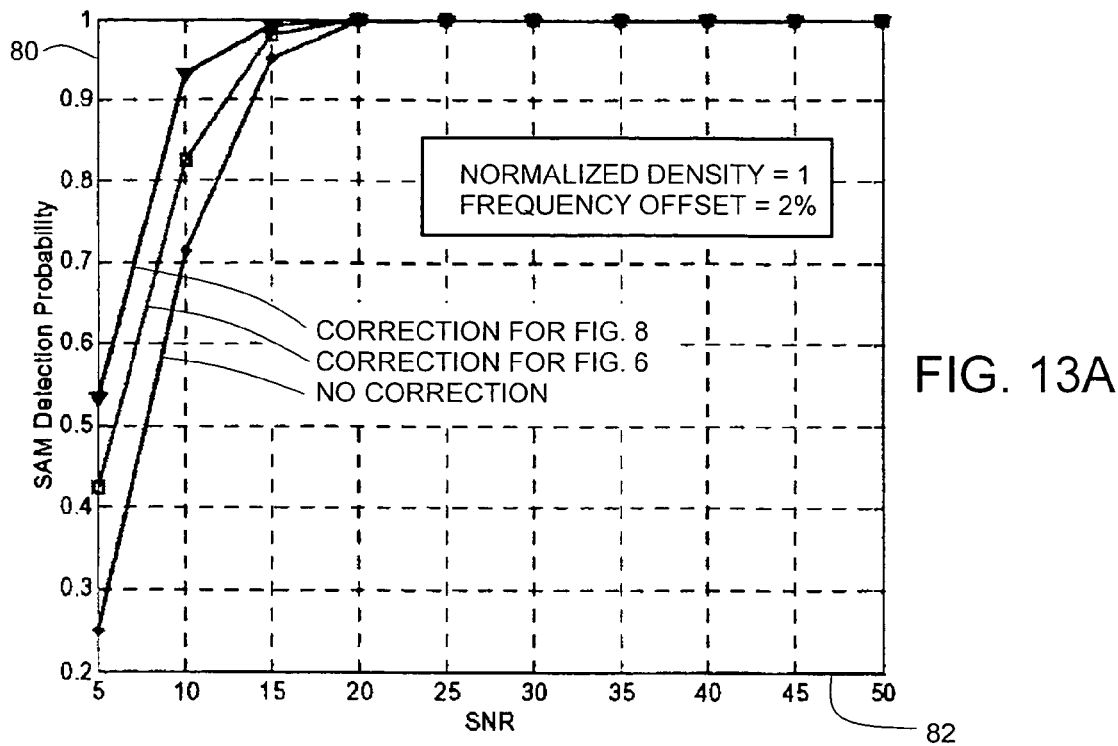
FIG. 13A illustrates servo address mark (SAM) detection probability as a function of signal-to-noise ratio (SNR) for a normalized density of 1 and a frequency offset of 2%.
Figure 13B:
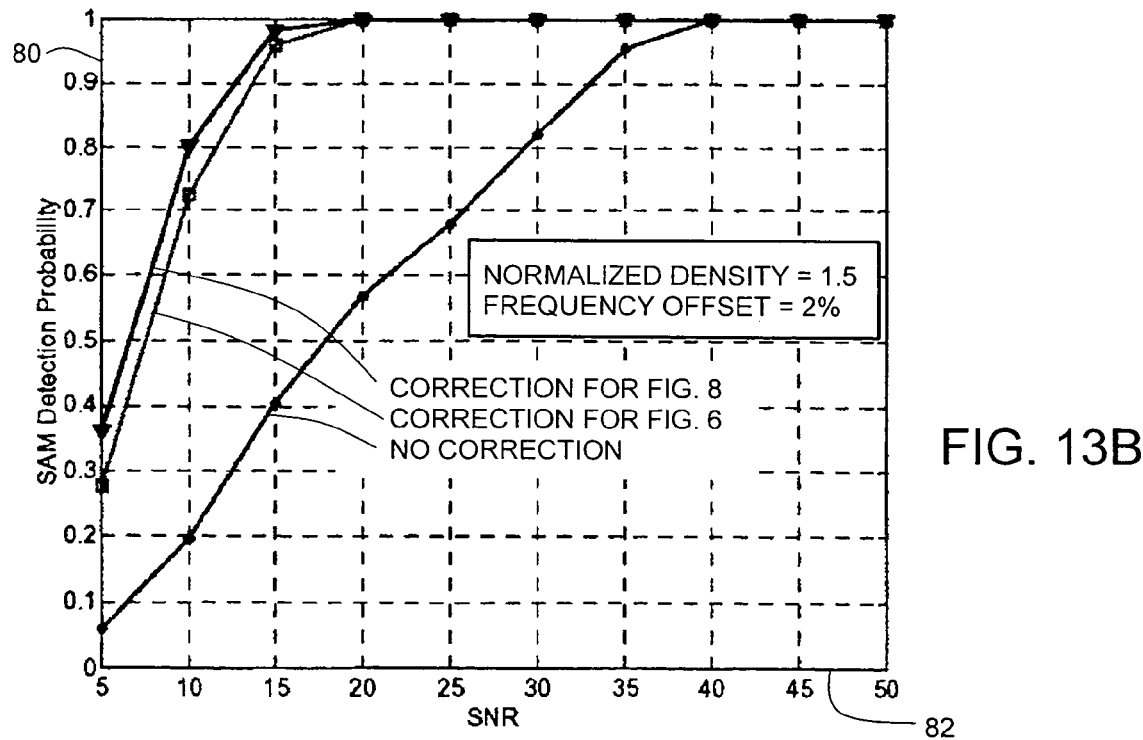
FIG. 13B illustrates servo address mark (SAM) detection probability as a function of signal-to-noise ratio (SNR) for a normalized density of 1.5 and a frequency offset of 2%.

FIG. 12 relates to the functionality of the radial incoherence estimator 804 (FIG. 8) and shows Hadamard domain representations of the signal at the output of the equalizer when there is no RI (1202), and when there is very strong RI (1204) resulting into 5% frequency offset. A vertical axis 1206 represents amplitude and a horizontal axis 1208 represents Hadamard sample number. Here, it assumed that the SAM field of the servo format is read, while sending the symbols [0 0 0 1 0 0 1 0 1] through the channel. As can be seen from FIG. 12, there is a big difference between the 21st and 23rd samples of the signal's Hadamard domain representation, depending on the RI amount in the system. The values of the 21st and 23rd samples are compared to determine the RI amount in the system to be weak or strong, and the timing loop parameters $\alpha$ and $\beta$ are chosen accordingly.

FIGS. 13A, 13B, 14A, 14B, 15, 16 illustrate SAM detection probability (vertical axes 80) as a function of signal-to-noise (SNR) ratio (horizontal axes 82) for various systems (FIG. 6 or FIG. 8), normalized densities (ND) of 1 or 1.5, frequency offsets FO) of 0%, 1%, 2%, 3%, 4% or 5%, with and without RI corrections, frequency offsets as indicated by legends and keys on the individual Figures. Similarly, FIGS. 17, 18, 19, 20, 21, 22 illustrate random pattern detection probabilities for various conditions indicated by legends and keys on the Figures.

With the equalizer profiles and the "Amount of RI estimator" block designed as explained above in connection with FIG. 8, FIGS. 13A, 13B show the SAM detection probability versus SNR curves for FIG. 6, FIG. 8, and an architecture with no RI correction. The system used is a perpendicular recording system with normalized density 1 and 1.5 with RI in the system resulting into 2% frequency offset. As can be seen from FIGS. 13A, 13B, the FIG. 6 solution improves the system performance compared to the system with no RI correction, and the FIG. 8 architecture gives additional gain on top of the FIG. 6 solution.

Figure 14A:
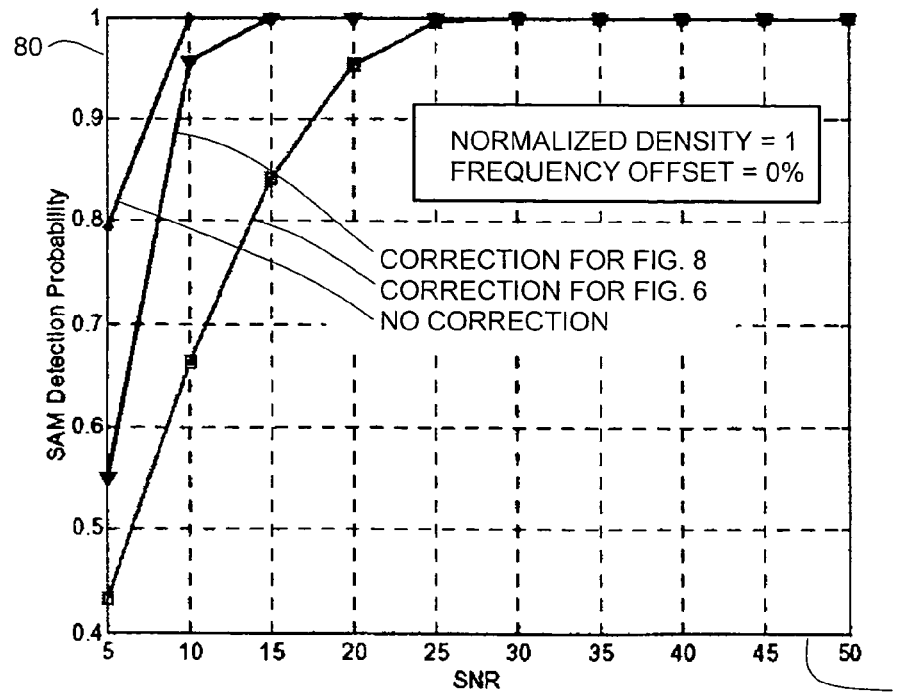
FIG. 14A illustrates servo address mark (SAM) detection probability as a function of signal-to-noise ratio (SNR) for a normalized density of 1 and a frequency offset of 0%.
Figure 14B:
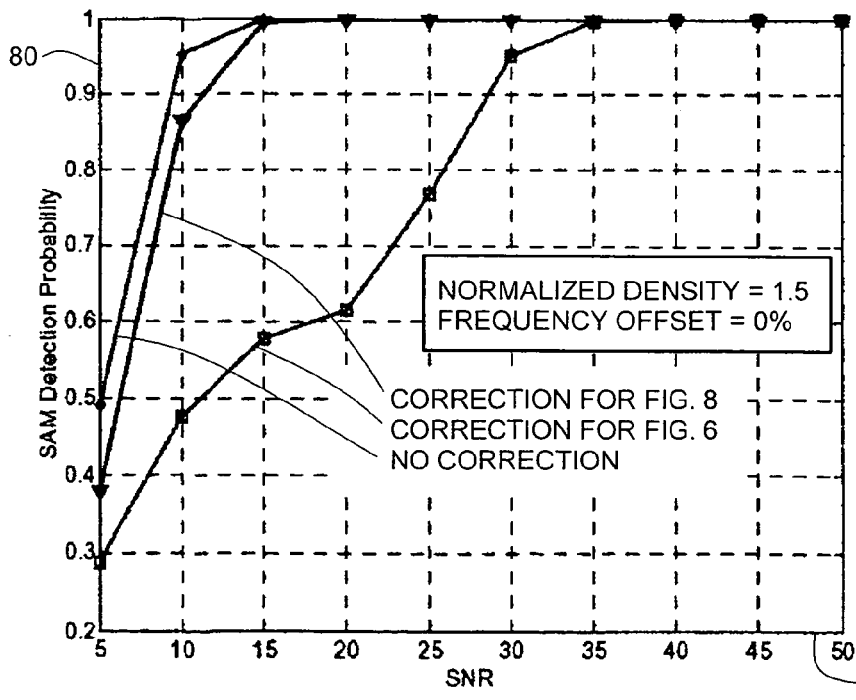
FIG. 14B illustrates servo address mark (SAM) detection probability as a function of signal-to-noise ratio (SNR) for a normalized density of 1.5 and a frequency offset of 0%.

Then, in FIGS. 14A, 14B, the system performances are shown with no RI. The system with no RI correction would be expected to perform better among the three. As can be seen, the performance of the FIG. 6 solution is far from that of no RI correction. However, the FIG. 8 architecture closely follows the performance curve of system with no RI correction. The loss of the FIG. 6 solution becomes more pronounced when the noise in the system is lower, and/or the ND of the recording architecture is larger. In case of no RI in the system, the FIG. 6 architecture behaves as well as the others only for systems with lower ND and higher SNR.

Figure 15:
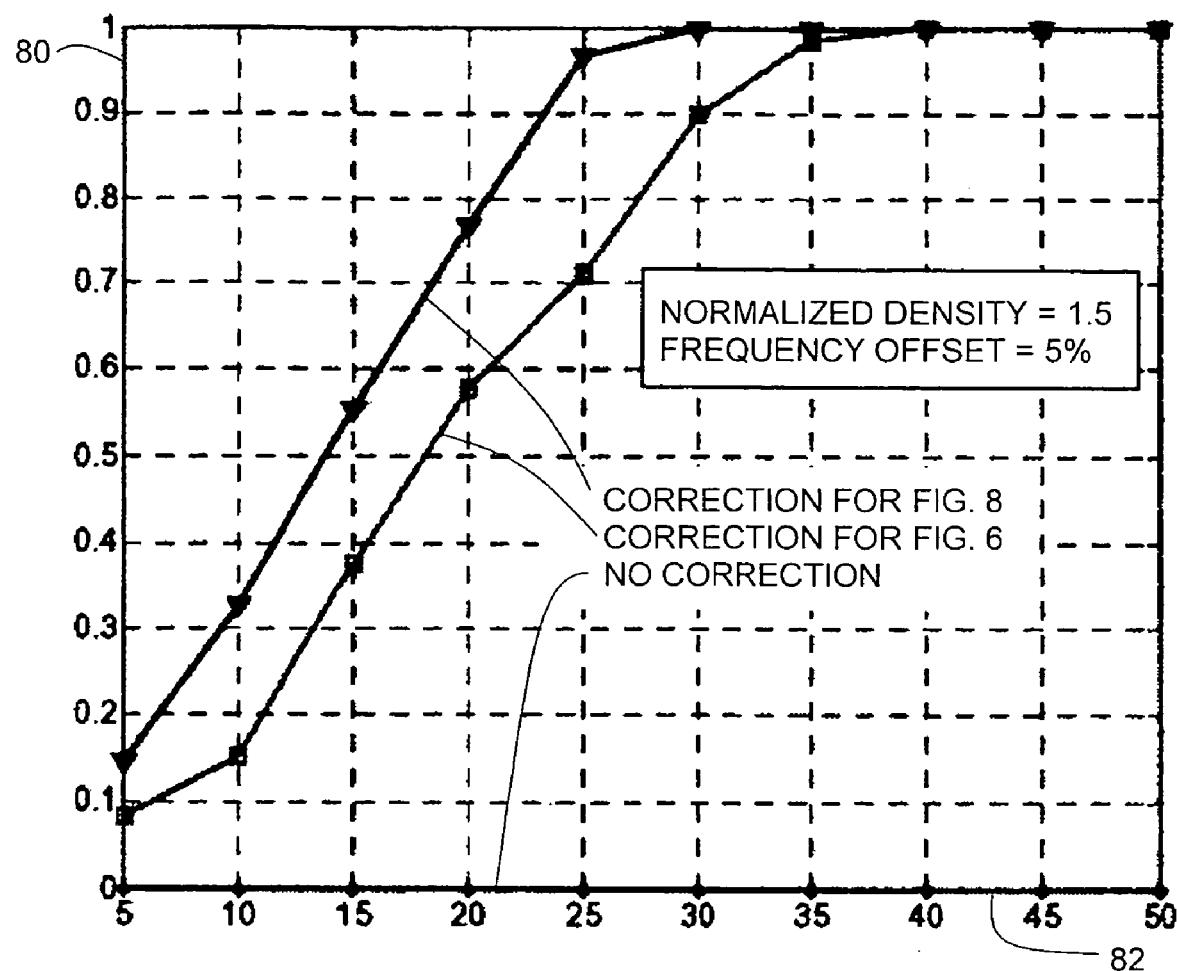
FIG. 15 illustrates servo address mark (SAM) detection probability as a function of signal-to-noise ratio (SNR) for a normalized density of 1.5 and a frequency offset of 5%.

FIG. 15 shows the limiting performances of the algorithms when there is RI effect which causes 5% frequency offset in a perpendicular system with ND equal to 1.5. As seen from this FIG. 15, the system with no RI correction is already dead, but the FIG. 8 algorithm and the FIG. 6 algorithm still performs fine at high SNR values, and the FIG. 8 algorithm outperforms the FIG. 6 algorithm.

The 5% frequency offset in the system is very large, and such large amounts of RI may exceed system specifications. For systems with RI effects which create frequency offset up to 3% of the T clock, there is no need for the block "Amount of RI estimator". Instead, one set of $\alpha$ and $\beta$ can be found which is good for all practical values of RI in the system.

Figure 16:
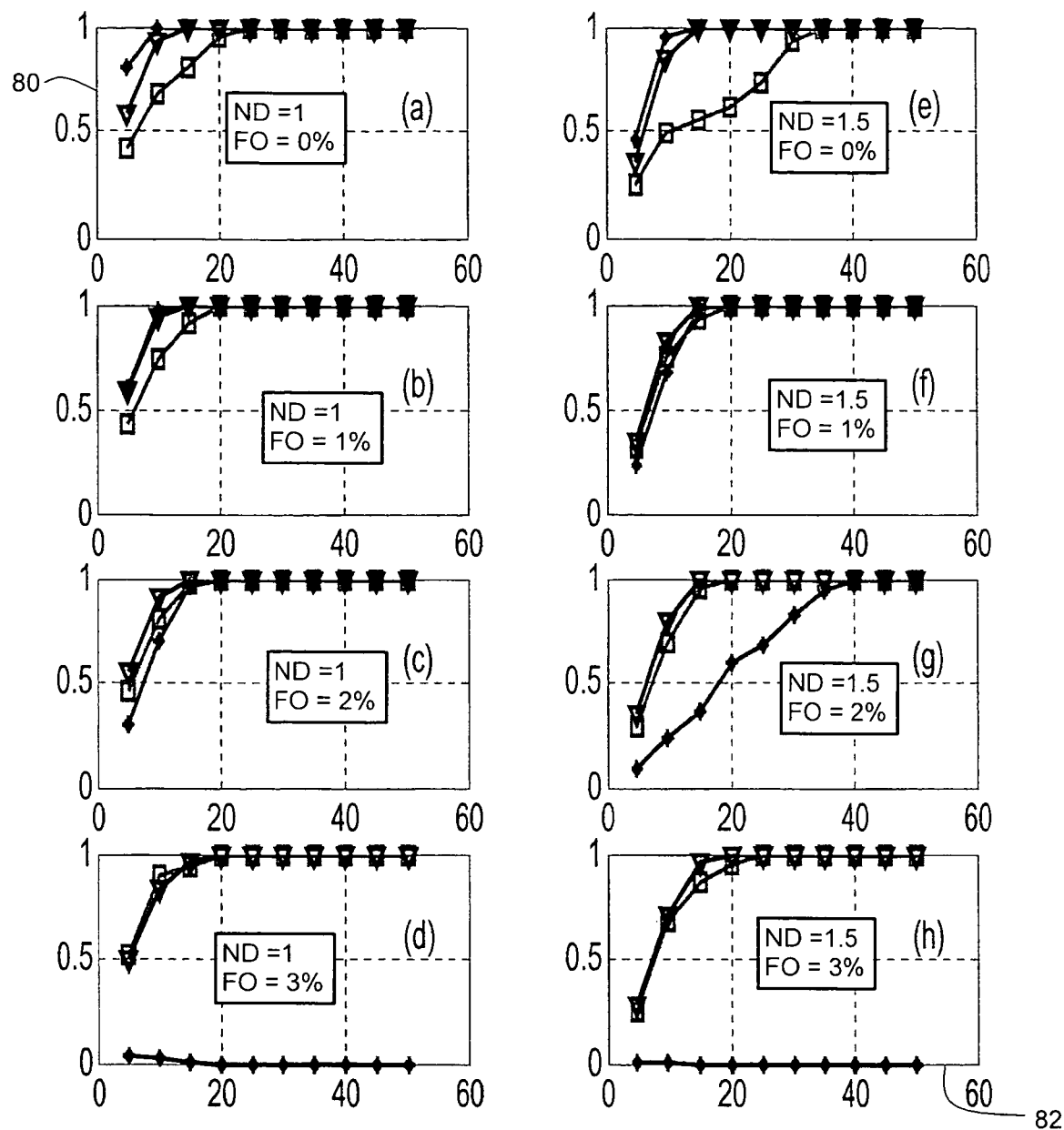
FIG. 16 illustrates sample servo address mark (SAM) detection probabilities as a function of signal-to-noise ratio (SNR) for normalized density (ND) of 1.0 and 1.5 and a frequency offset (FO) of 0%, 1%, 2%, 3%.

FIG. 16 shows the performance comparison of the architectures for perpendicular systems with ND equal to 1 and 1.5 in presence of 0% to 3% frequency offset caused by the RI effect. FIG. 16 shows:

For systems with no RI effect, the FIG. 6 solution misinterprets the noise in the system as RI, and performs much worse than the system having no correction. This difference becomes much more evident in recording architectures with larger normalized density. In this case, the proposed solution closely follows the performance of the system with no RI correction.

As the amount of RI increases, the performance of the system with no RI correction decreases, and eventually at high RI effects the system performance becomes zero. In these cases, the FIG. 6 solution starts following the RI effect in the system. The proposed method either gives more gain on top of the FIG. 6 solution, or yields similar performance.

Next, in FIGS. 17-22, the effect of the three different methods on random bit stream are considered instead of considering only the SAM field. Here, an "Amount of RI estimator" block was not used, and instead one set of $\alpha$ and $\beta$ were found which is good for all practical values of RI in the system (i.e., 0% to 3% of frequency offset in this particular example). During the Track ID field of the servo format, the data is gray coded, however, until the end of the threshold detector in FIG. 6 architecture, the gray code property of the Track ID is not used. That's why choosing the pattern to be random is a good model for Track ID at this level.

Figure 17:
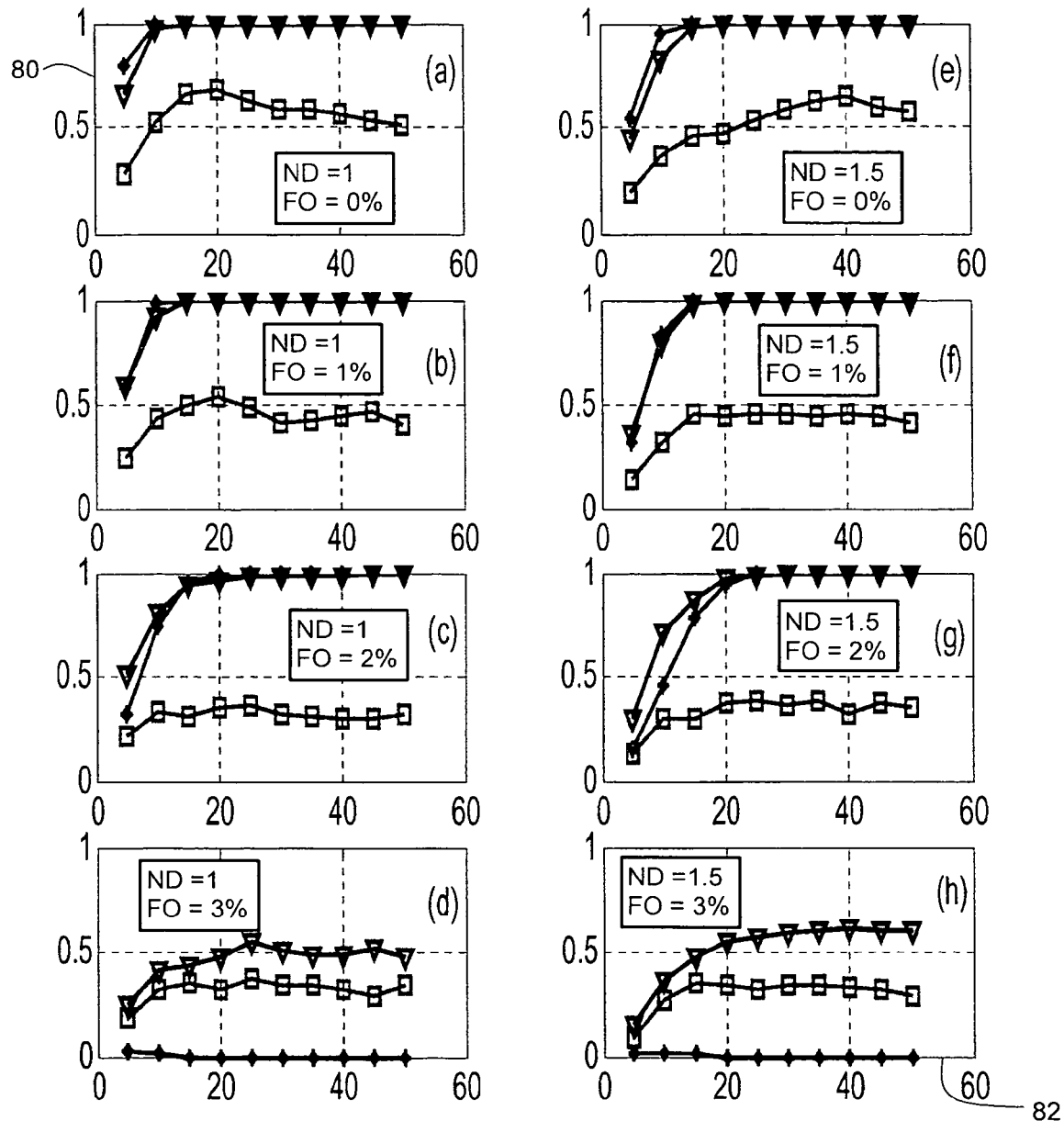
FIG. 17 illustrates random pattern detection probabilities as a function of signal-to-noise ratio (SNR) for normalized density (ND) of 1.0 and 1.5 and a frequency offset (FO) of 0%, 1%, 2%, 3%.
Figure 17:
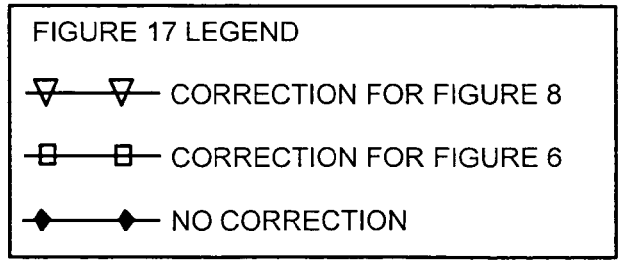
Figure 18:
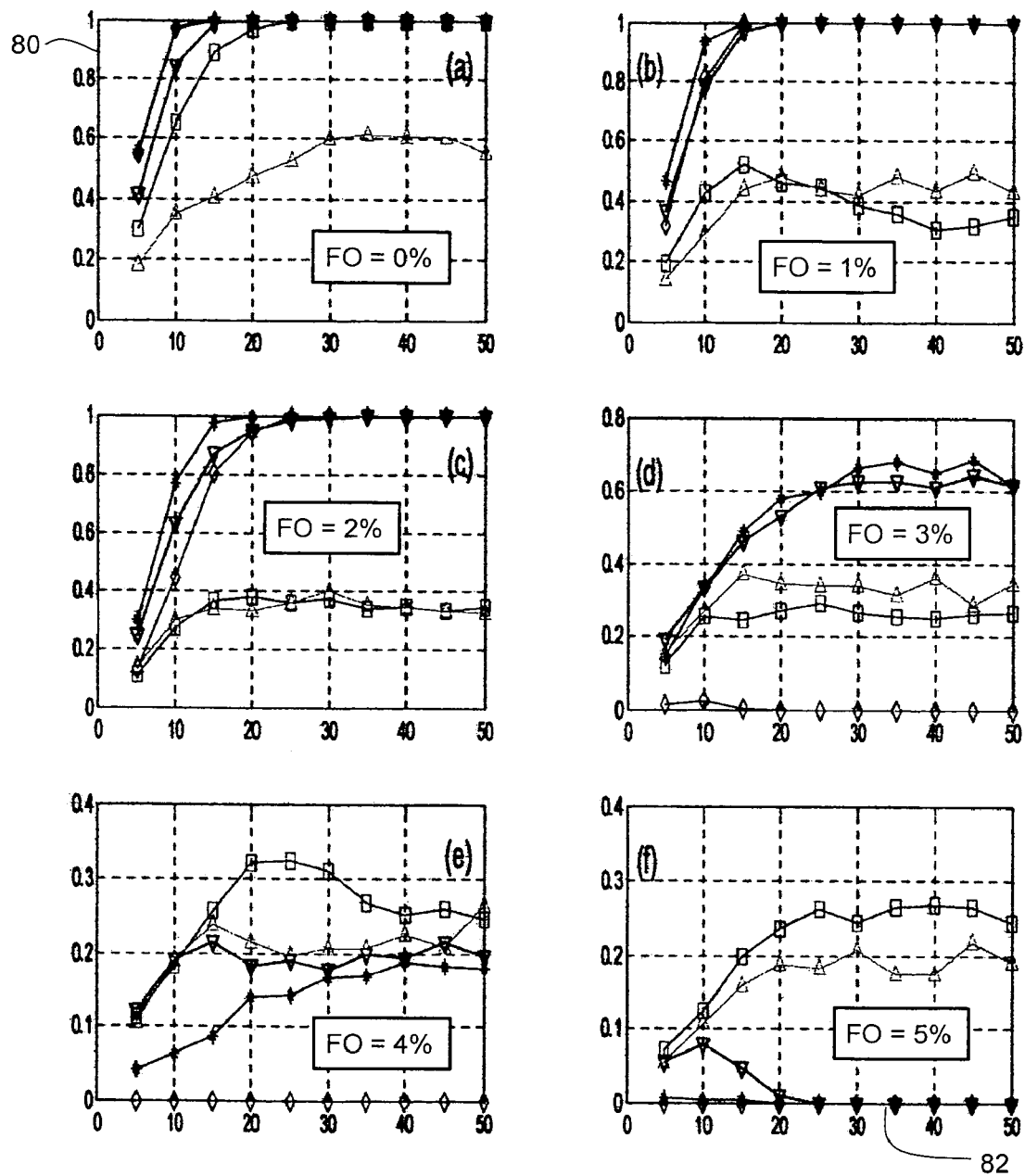
FIG. 18 illustrates random pattern detection probabilities as a function of signal-to-noise ratio (SNR) for timing loop parameters equal to zero.

FIG. 17 compares the performances of the methods. As can be seen from FIG. 17, the FIG. 6 solution detects, on the average, around half of the random patterns (of 36 bit long, or 9 symbols long in this example) without any error. The remaining undetected ones are further processed using the Track ID detection block to find the desired track. As the Track IDs are gray coded, there is a big dependence between the consecutive Track ID numbers, This dependence makes it possible to detect the Track ID correctly even with pattern detection probability of around 0.5 at the end of the threshold detector. In the light of this, FIG. 17 shows:

The FIG. 8 method and the system with no RI correction works much better than the FIG. 6 solution until the RI amount becomes very high.

The system with no RI correction dies out whenever the amount RI becomes very high. However, the FIG. 8 method still continues to outperform the FIG. 6 solution.

Thus, as has also been shown with SAM pattern, the FIG. 8 method again outperforms the FIG. 6 solution when the pattern is assumed to be random. Similar results are obtained also with SIM pattern.

So far, it has been shown that the FIG. 8 method outperforms the FIG. 6 architecture. Assuming the "Correlator" block to be fixed, the FIG. 8 method has three more novel functionalities, namely the FIG. 8 equalizer design, "Amount of RI estimator" block, and the "New Detector" block. Next, their effects on the system performance are quantified, and the reduction of implementation costs for different system configurations is considered. For the sake of illustrations, perpendicular recording with ND equal to 1.5 is chosen.

FIGS. 18-22 show "Random Pattern Detection Probability" vs SNR curves for systems with RI resulting into 0% (a), 1% (b), 2% (c), 3% (d), 4% (e), and 5% (f) frequency offsets.

In FIGS. 18-21 the legends "triangles pointing down" do not have any "Amount of RI estimator" block. However, the one in FIG. 22 employs the simplest version of the "Amount of RI estimator" block (Method 1) explained above. After a close look of those plots, the following is observed:

For systems with No RI Correction, the change of equalizer design from the FIG. 6 method to the FIG. 8 method yields a big improvement in the system performance. This shows that, the resulting equalizer designed with the FIG. 8 method is much more robust to frequency offsets in the system.

Similarly, the FIG. 8 equalizer design method also improves system performance when used in the FIG. 6 architecture, especially at very low and very high frequency offsets. In between, both the FIG. 8 method and the FIG. 6 method yields similar performances.

In absence of "Amount of RI estimator" block and with the timing loop parameters chosen to be zero (FIG. 18), the proposed architecture corresponds to plain Viterbi algorithm. The decision delay of the Viterbi detector is chosen to be 4. In this case, the architecture with No RI correction together with the proposed equalizer performs better than the Viterbi algorithm at low frequency offsets. The Viterbi algorithm is more robust to larger frequency offset values, and outperforms the former at frequency offset value equal to 4%.

Figure 19:
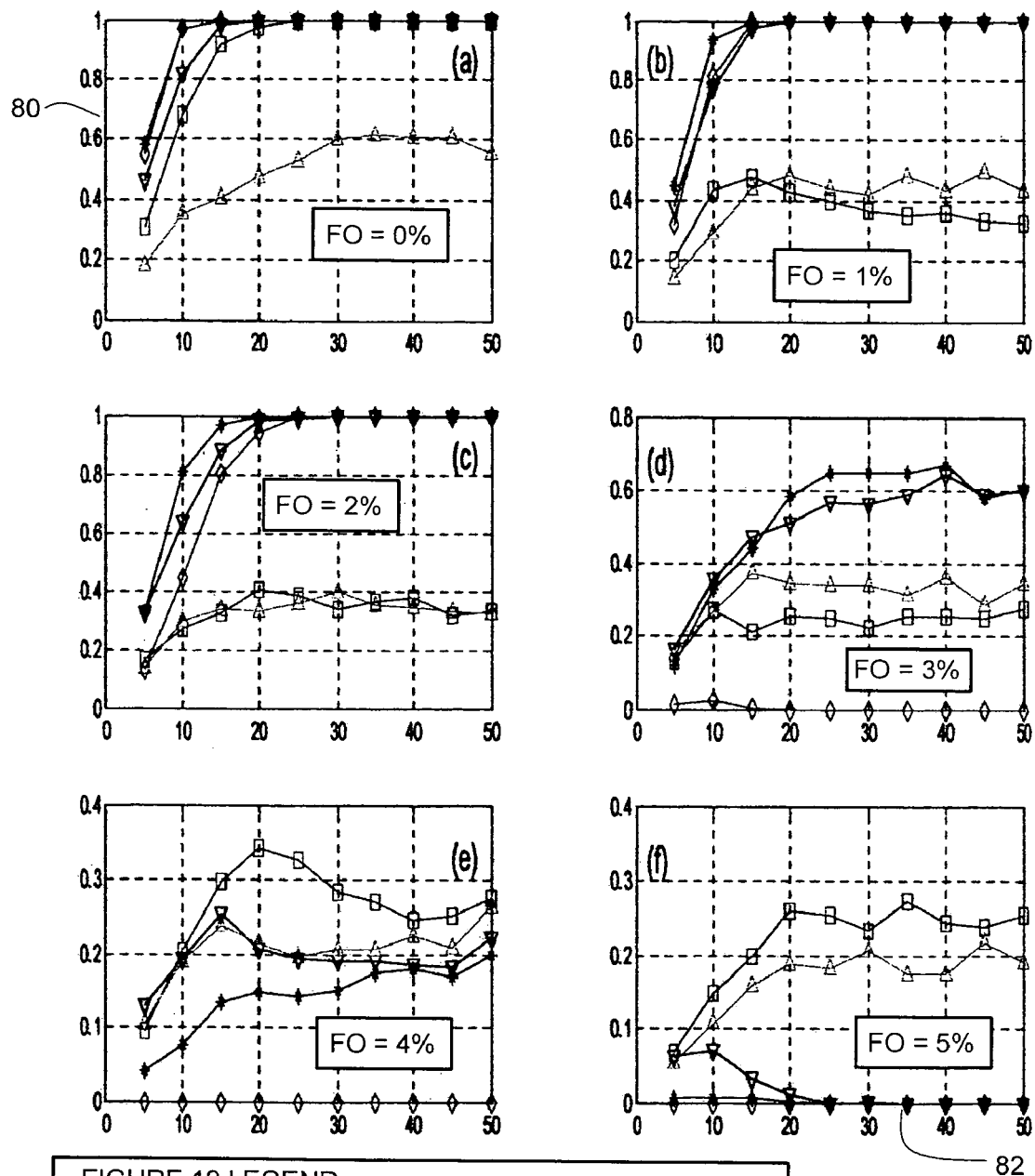
FIG. 19 illustrates random pattern detection probabilities as a function of signal-to-noise ratio (SNR) for very small timing loop parameters.
Figure 20:
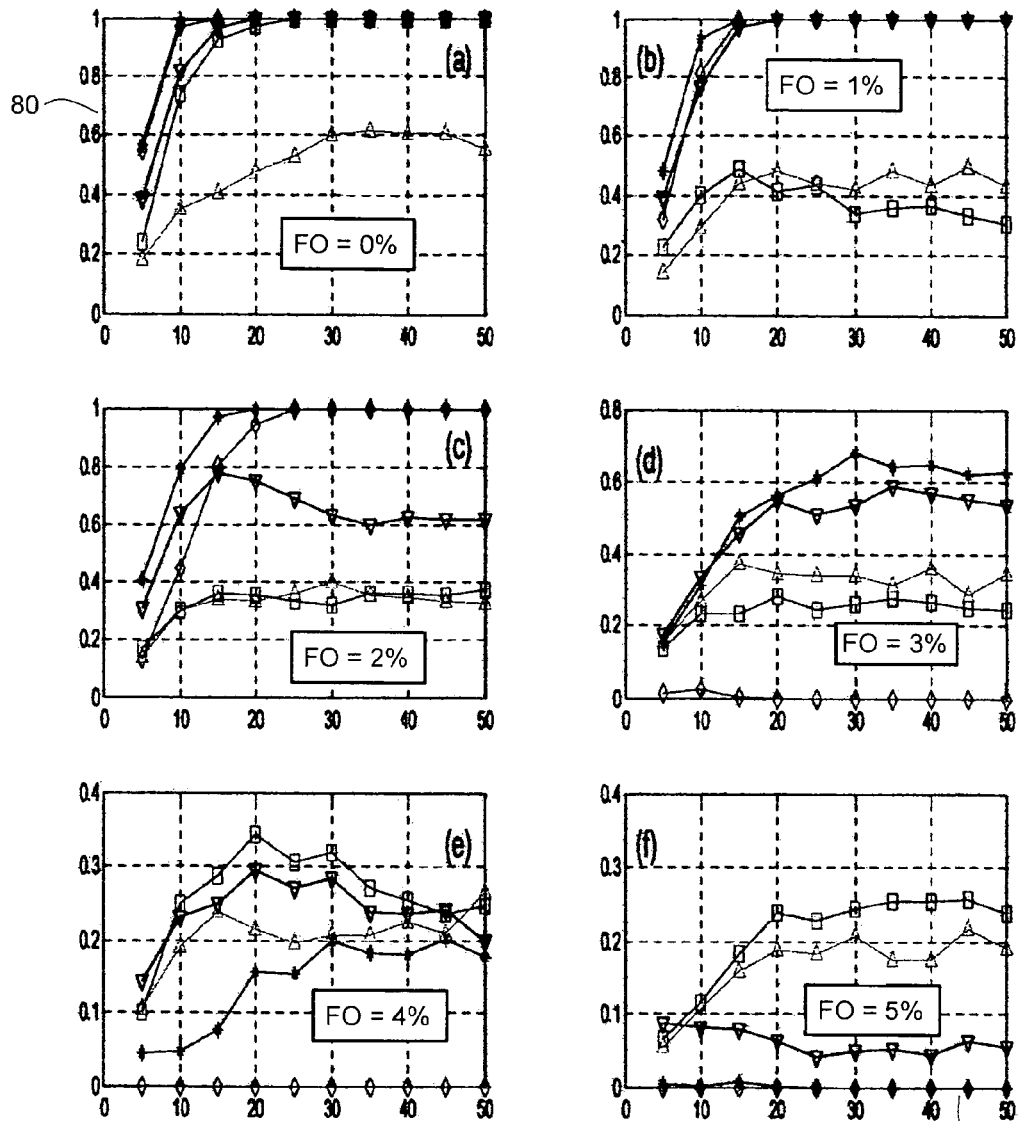
FIG. 20 illustrates random pattern detection probabilities as a function of signal-to-noise ratio (SNR) for intermediate timing loop parameters.

If more performance gain is desired in the presence of very strong RI effects which cause large frequency offset values, the timing loop parameters can be increased within the "New Detector" block. FIG. 19 compares the performance of the "New Detector" with very small timing loop parameters. As can be seen, slightly better performance is obtained, especially at frequency offset equal to 4% without losing performance at lower frequency offset values (compare the legends indicated with "triangles pointing down" in FIGS. 18 and 19).

Further increase in timing loop parameter values (FIG. 20) within the "New Detector" block results in gain for systems in presence of large frequency offsets, in contrary to some loss at low frequency offset values.

Figure 21:
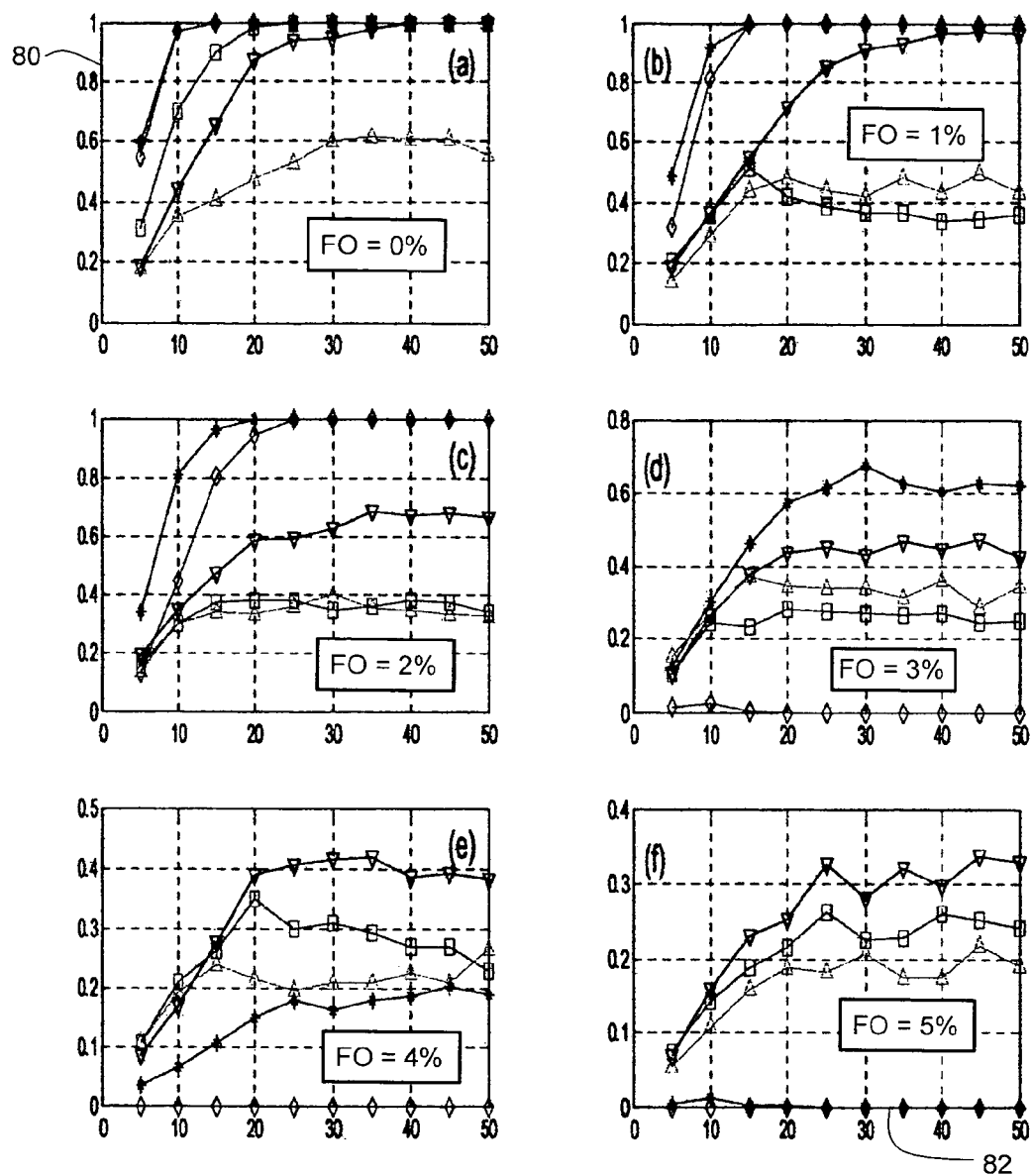
FIG. 21 illustrates random pattern detection probabilities as a function of signal-to-noise ratio (SNR) for large timing loop parameters.

More can be gained for RI effects which cause very large frequency offset values, if the timing loop parameters continue to increase. In FIG. 21, the loop parameters are chosen to be very large, and there is considerable improvement in system performance at large frequency offsets. Although systems in presence of small frequency offsets lose performance, performance is always much better than the FIG. 6 architecture, and most of the time better than the FIG. 6 architecture with the equalizer designed using the FIG. 8 method.

Figure 22:
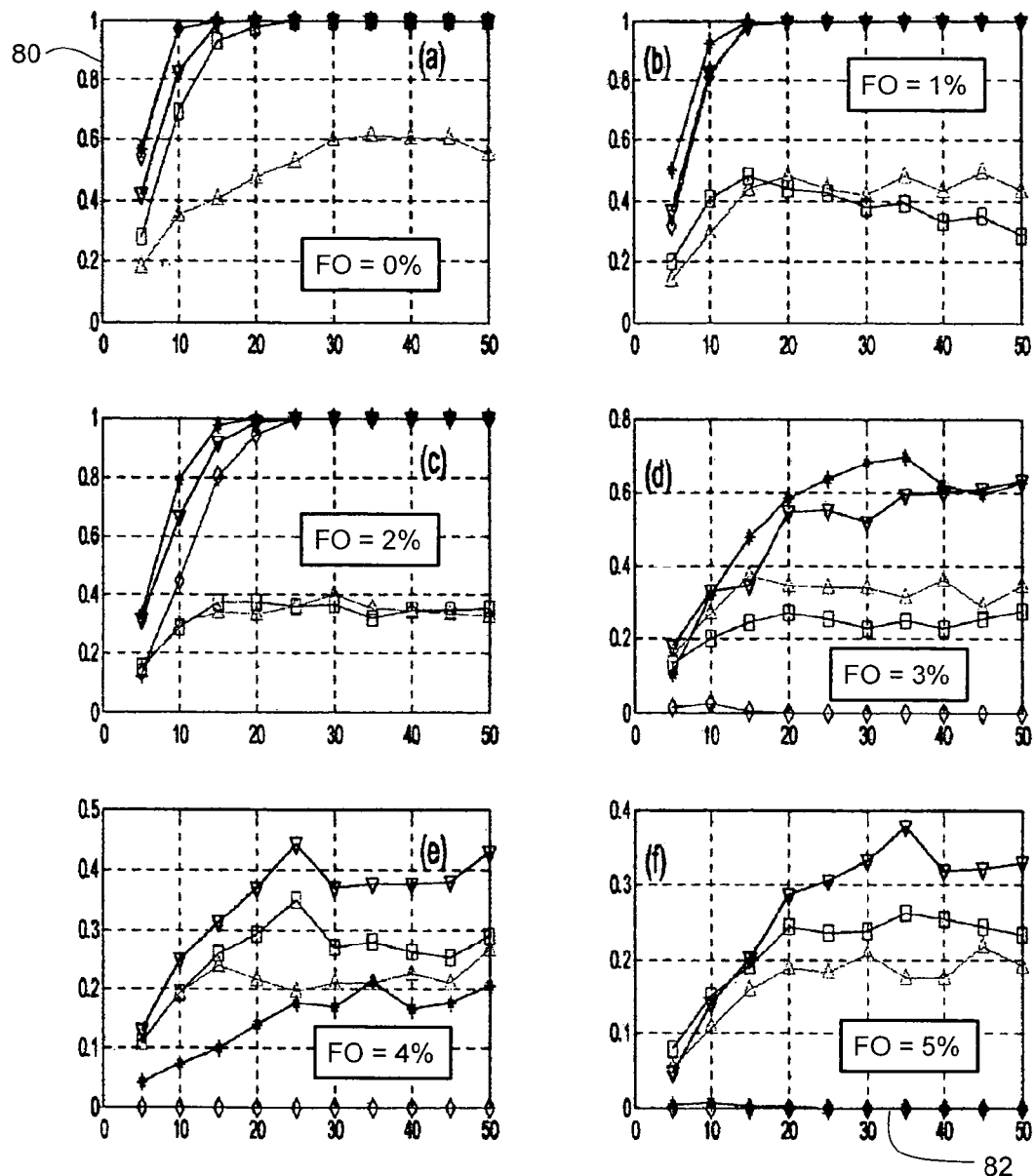
FIG. 22 illustrates random pattern detection probabilities as a function of signal-to-noise ratio (SNR) for small and large timing loop parameter sets.

FIGS. 18, 19, 20, and 21 did not employ any "Amount of RI estimator" block. However, the timing loop parameters can be chosen inside the "New Detector" block according to the amount of RI, and don't have to compromise the performances at small RI effects in order to increase the system gain at large RI effects. As can be seen in FIG. 22, with a very simple "Amount of RI estimator" block:

At low frequency offset values, system performance can be obtained that is very close to the performance of the one with NO RI Correction empowered with the FIG. 8 equalizer design. At high frequency offset values, the performance of the one with NO RI Correction dies out, although the FIG. 8 one still gives good performance figures.

The FIG. 8 architecture always outperforms the FIG. 6 solution even with the FIG. 8 equalizer design proposed in this document.

In the light of these observations, the following can be observed:

The FIG. 8 equalizer design is robust to frequency offset changes. Thus, for systems with low or moderate RI effects (corresponding up to 3% frequency off-set values), optimizing the FIG. 8 equalizer and using it with the threshold detector is sufficient. This results into less complex architecture and more system gain compared to the FIG. 6 method.

To increase the system robustness against RI effects which correspond up to 3% to 4% frequency offset, the "New Detector" architecture can be employed with very small timing loop parameters. The increase in system robustness comes together with an increase in implementation cost.

The values of the timing loop parameters within the "New Detector" architecture can be tuned to the quantified amount of RI present in the system. For example, if the amount of RI is very large, like causing 4% to 5% frequency offset, the values of the timing loop parameters can increase, and performance increases can be obtained.

If the range of the RI effects (i.e., the frequency offsets caused by the RI effect) are not known, and/or an architecture is needed which works for very wide range of frequency offset values, then the "Amount of RI estimator" block can be employed with a little increase in implementation cost, and good performance figures can be obtained among the other architectures for all simulated RI effects.

In FIG. 8, the architecture is so modular that one can choose only the blocks needed corresponding to a range of the amount of RI in the system. Thus, one can trade off complexity with the performance to choose the correct architecture for the correct system. For example, if the amount of RI is small to moderate, updating using only the equalizer design from FIG. 8 is sufficient. If one wants more system robustness and/or some gain at higher RI effects, one needs to employ the "New Detector" block, and tune its loop parameters accordingly. If one needs a solution for very wide range of RI effects in the system, then one has to also insert the "Amount of RI estimator" block, and use more than one set of timing loop parameters inside the "New Detector" block.

The embodiments are typically realized using one or more integrated circuits. The internal functioning of a sample integrated circuit embodiment can be verified by applying simulated test patterns to both the sample integrated circuit and a software model and then comparing the outputs of the sample integrated circuit to the outputs of the software model to see if there is substantial similarity of the output responses. The simulated test patterns can be provided with artificially high noise margins to reduce random errors during the comparison, or can be provided with simulated errors to test responses of the sample integrated circuit embodiment to errors. When substantially identical results are obtained for both the sample integrated circuit embodiment and its corresponding software model, this verifies that the internal structure of the sample circuit is substantially the same as the software model.

In a preferred embodiment, sample integrated circuits are provided with test outputs or test view modes so that inputs and outputs of various internal blocks of circuitry can be observed more directly while various test patterns are applied at inputs. The test outputs or test views can provide alternative verification that sample circuits conform to a software block diagram model.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo track sensing system while maintaining substantially the same functionality without departing from the scope and spirit of the present invention. It will be appreciated by those skilled in the art that the embodiments described herein can be used with known read heads including magnetoresistive, giant magnetoresistive (GMR), tunneling magnetoresistive (TMR) heads, and can also be used with moving heads in MRAM systems. In addition, although the preferred embodiment described herein is directed to a servo track sensing system for data tracks with concentric round geometries, it will be appreciated by those skilled in the art that the teachings of the present invention can be applied to data tracks or data patterns with other geometries that include servo data, without departing from the scope and spirit of the present invention.

What is claimed is:

1. A servo track sensing system that corrects for radial incoherence, comprising:
   a radial incoherence estimator receiving equalized servo data, and providing a radial incoherence estimate;
   a sequence detector receiving the equalized servo data and the radial incoherence estimate, the sequence detector providing a sequence detector output; and
   a correlator receiving the sequence detector output and providing correlator output data with a reduced level of errors due to radial incoherence.

2. The servo track sensing system of claim 1, further comprising:
   an FIR filter receiving unequalized servo data and providing the equalized servo data, the FIR filter including an equalizer that equalizes over a single clock cycle (1T).

3. The servo tracking system of claim 2 wherein the unequalized servo data comprises track error data.

4. The servo track sensing system of claim 2 wherein the equalizer comprises an equalizer $\hat{f}$ that equalizes according to the formula:

$$\hat{f} = \hat{K}_f^{-1} \hat{R}^{sa} (\hat{R}^{aa})^{-1} \hat{C}_g \bar{\lambda}_g + \hat{K}_f^{-1} \hat{C}_f \bar{\lambda}_f$$

5. The servo track sensing system of claim 2 wherein the sequence detector comprises a Viterbi sequence detector and interpolation filters.

6. The servo track sensing system of claim 5 wherein the sequence detector samples the equalizer at viterbi detector branches.

7. The servo track sensing system of claim 1 wherein the sequence detector comprises a maximum likelihood sequence detector.

8. The servo track sensing system of claim 7 wherein the maximum likelihood sequence detector maximizes a maximum likelihood metric:

$$p(z \mid \bar{a}) = \frac{1}{\left(\sqrt{2\pi\sigma_n^2}\right)^{L+\mu}} \exp\left\{ \frac{-1}{2\sigma_n^2} \sum_{k=0}^{L+\mu-1} |z_k - \bar{d}_k|^2, \right\}.$$

9. The servo track sensing system of claim 7 wherein the maximum likelihood sequence detector minimizes a likelihood metric:

$$\sum_{k=0}^{L+\mu-1} |\bar{z}_k - \hat{d}_k|^2.$$

10. A method of correcting for radial incoherence in servo data, comprising:
    receiving equalized servo data at a radial incoherence estimator, and providing a radial incoherence estimate;
    receiving the equalized servo data and the radial incoherence estimate at a sequence detector, and providing a sequence detector output; and
    receiving the sequence detector output at a correlator and providing correlator output data with a reduced level of errors due to radial incoherence.

11. The method of claim 10, further comprising:
    receiving unequalized servo data at an FIR filter and providing the equalized servo data, and the FIR filter providing equalization over a single clock cycle (1T) using an equalizer in the FIR filter.

12. The method of claim 11 further comprising:
    providing position error signals as the unequalized servo data.

13. The method of claim 11 wherein the equalizer equalizes according to the formula:

$$\hat{f} = \hat{K}_f^{-1} \hat{R}^{sa} (\hat{R}^{aa})^{-1} \hat{C}_g \bar{\lambda}_g + \hat{K}_f^{-1} \hat{C}_f \bar{\lambda}_f$$

14. The method of claim 11 wherein the sequence detector comprises a Viterbi sequence detector and interpolation filters.

15. The method of claim 14 further comprising:
    sampling the equalizer at viterbi detector branches with the sequence detector.

16. The method of claim 10 further comprising:
    performing maximum likelihood sequence detection in the sequence detector.

17. The method of claim 16 further comprising:
maximizing a maximum likelihood metric:

$$p(\bar{z} \mid \bar{a}) = \frac{1}{\left(\sqrt{2\pi\sigma_n^2}\right)^{L+\mu}} \exp\left\{\frac{-1}{2\sigma_n^2} \sum_{k=0}^{L+\mu-1} |\bar{z}_k - \bar{d}_k|^2,\right\}$$

in the sequence detector.

18. The method of claim 16 further comprising:
minimizing a metric $$\sum_{k=0}^{L+\mu-1} |\bar{z}_k - \hat{d}_k|^2$$

in the sequence detector.

19. A servo track sensing system that corrects for radial incoherence, comprising:

radial incoherence estimator means for receiving equalized servo data, and for providing a radial incoherence estimate;

sequence detector means for receiving the equalized servo data and the radial incoherence estimate, and for providing a sequence detector output; and correlator means for receiving the sequence detector output and providing correlator output data with a reduced level of errors due to radial incoherence.

20. The servo track sensing system of claim 19, further comprising:

an FIR filter receiving unequalized servo data and providing the equalized servo data, the FIR filter including an equalizer that equalizes over a single clock cycle (1T).

* * * * *

UNITED STATES PATENT AND TRADEMARK OFFICE
CERTIFICATE OF CORRECTION

PATENT NO. : 7,286,313 B2
APPLICATION NO. : 11/012813
DATED : October 23, 2007
INVENTOR(S) : Mehmet Fatih Erden et al.

It is certified that error appears in the above-identified patent and that said Letters Patent is hereby corrected as shown below:

Please change the equation in claim 13 (Col. 18) line 57 " $\bar{f} = \hat{K}_f^{-1} \hat{R}^{sa} (\hat{R}^{aa})^{-1} \hat{C}_{g\bar{\lambda}g} + \hat{K}_f^{-1} \hat{C}_f \bar{\lambda}_f$ "

to -- $\bar{f} = \hat{K}_f^{-1} \hat{R}^{sa} (\hat{R}^{aa})^{-1} \hat{C}_{g\bar{\lambda}g} + \hat{K}_f^{-1} \hat{C}_f \bar{\lambda}_f$ --

Signed and Sealed this

Twenty-fifth Day of March, 2008

JON W. DUDAS
*Director of the United States Patent and Trademark Office*